United States Patent
Toba et al.

(10) Patent No.: US 9,311,258 B2
(45) Date of Patent: *Apr. 12, 2016

(54) METHOD, APPARATUS AND CABLE FOR ENABLING TWO TYPES OF HDMI COMMUNICATION

(71) Applicant: Sony Corporation, Tokyo (JP)

(72) Inventors: Kazuaki Toba, Kanagawa (JP); Gen Ichimura, Tokyo (JP); Kazuyoshi Suzuki, Tokyo (JP); Hideyuki Suzuki, Kanagawa (JP); Toshihide Hayashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/189,292

(22) Filed: Feb. 25, 2014

(65) Prior Publication Data

US 2014/0181336 A1  Jun. 26, 2014

Related U.S. Application Data

(63) Continuation of application No. 13/329,766, filed on Dec. 19, 2011, now Pat. No. 8,745,305.

(30) Foreign Application Priority Data

Dec. 28, 2010  (JP) ................. P2010-292472

(51) Int. Cl.
*G06F 13/20* (2006.01)
*G06F 13/42* (2006.01)
(Continued)

(52) U.S. Cl.
CPC ............ *G06F 13/20* (2013.01); *G06F 13/4068* (2013.01); *G06F 13/4282* (2013.01); *H04N 21/43635* (2013.01); *G06F 2213/0016* (2013.01)

(58) Field of Classification Search
CPC ............ G06F 2213/0016; G06F 13/40; G06F 13/409; G06F 13/4282
USPC ................................. 710/313, 316
See application file for complete search history.

(56) References Cited

U.S. PATENT DOCUMENTS 8,745,305 B2 * 6/2014 Toba et al. .................. 710/316
2005/0182876 A1 8/2005 Kim et al.
(Continued)

FOREIGN PATENT DOCUMENTS

EP           1632864 A2    3/2006
WO        2009118582 A1   10/2009

OTHER PUBLICATIONS

The I2C-Bus Specification, Version 2.1; Philips Semiconductors; Jan. 2000.*
"High-Definition Multimedia Interface Specification Version 1.4," HDMI Licensing, LLC, Jun. 5, 2009.
(Continued)

*Primary Examiner* — Glenn A Auve
(74) *Attorney, Agent, or Firm* — Hazuki International, LLC

(57) ABSTRACT

An electronic apparatus includes a first communication unit configured to perform I2C bidirectional communication with an external apparatus using two signal lines included in a transmission path as I2C communication lines, a second communication unit configured to perform bidirectional differential communication with the external apparatus using the two signal lines as high-speed data communication lines, a switching unit configured to select a first communication state in which the first communication unit is connected to the two signal lines or a second communication state in which the second communication unit is connected to the two signal lines, and a controller configured to control operation of the switching unit.

4 Claims, 27 Drawing Sheets

(51) Int. Cl.
*G06F 13/40* (2006.01)
*H04N 21/4363* (2011.01)

(56) References Cited

U.S. PATENT DOCUMENTS

2009/0201421 A1 8/2009 Mawatari et al.
2009/0248924 A1 10/2009 Melin
2013/0191563 A1 7/2013 Toba et al.

OTHER PUBLICATIONS

European Search Report from EP Application No. 11194247, dated Apr. 3, 2013.
"SD Memory CRD Specifications. Simplified Version of: Part 1 Physical Layer Specification" Internet Citation, Apr. 30, 2001, XP 002291858, Retrieved from the Internet: URL:http://www.sandisk.com/pdf/oems/SD_Physical_specsv101.pdf.

* cited by examiner

FIG. 6B

| PIN | SIGNAL ASSIGNMENT |
|---|---|
| 1 | TMDS Data0+ |
| 2 | TMDS Data4+ |
| 3 | TMDS Data0− |
| 4 | TMDS Data1+ |
| 5 | TMDS Data4− |
| 6 | TMDS Data1− |
| 7 | TMDS Data2+ |
| 8 | TMDS Data5+ |
| 9 | TMDS Data2− |
| 10 | TMDS Data3+ |
| 11 | TMDS Data5− |
| 12 | TMDS Data3− |
| 13 | CEC |
| 14 | Utility/HEAC+ |
| 15 | SCL |
| 16 | SDA |
| 17 | DDC/CEC Ground/HEAC Shield |
| 18 | +5 V Power |
| 19 | Hot Plug Detect/HEAC− |

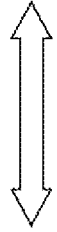

FIG. 6A
(TYPE−A) PRIOR ART

| PIN | SIGNAL ASSIGNMENT |
|---|---|
| 1 | TMDS Data2+ |
| 2 | TMDS Data2 Shield |
| 3 | TMDS Data2− |
| 4 | TMDS Data1+ |
| 5 | TMDS Data1 Shield |
| 6 | TMDS Data1− |
| 7 | TMDS Data0+ |
| 8 | TMDS Data0 Shield |
| 9 | TMDS Data0− |
| 10 | TMDS Clock+ |
| 11 | TMDS Clock Shield |
| 12 | TMDS Clock− |
| 13 | CEC |
| 14 | Utility/HEAC+ |
| 15 | SCL |
| 16 | SDA |
| 17 | DDC/CEC Ground/HEAC Shield |
| 18 | +5 V Power |
| 19 | Hot Plug Detect/HEAC− |

FIG. 14

| Byte # | 7 | 6 | 5 | 4 | 3 | 2 | 1 | 0 |
|---|---|---|---|---|---|---|---|---|
| | Rsvd(0) | Rsvd(0) | Rsvd(0) | Rsvd(0) | Rsvd(0) | New Rx Sink | New Cable | Rsvd(0) |

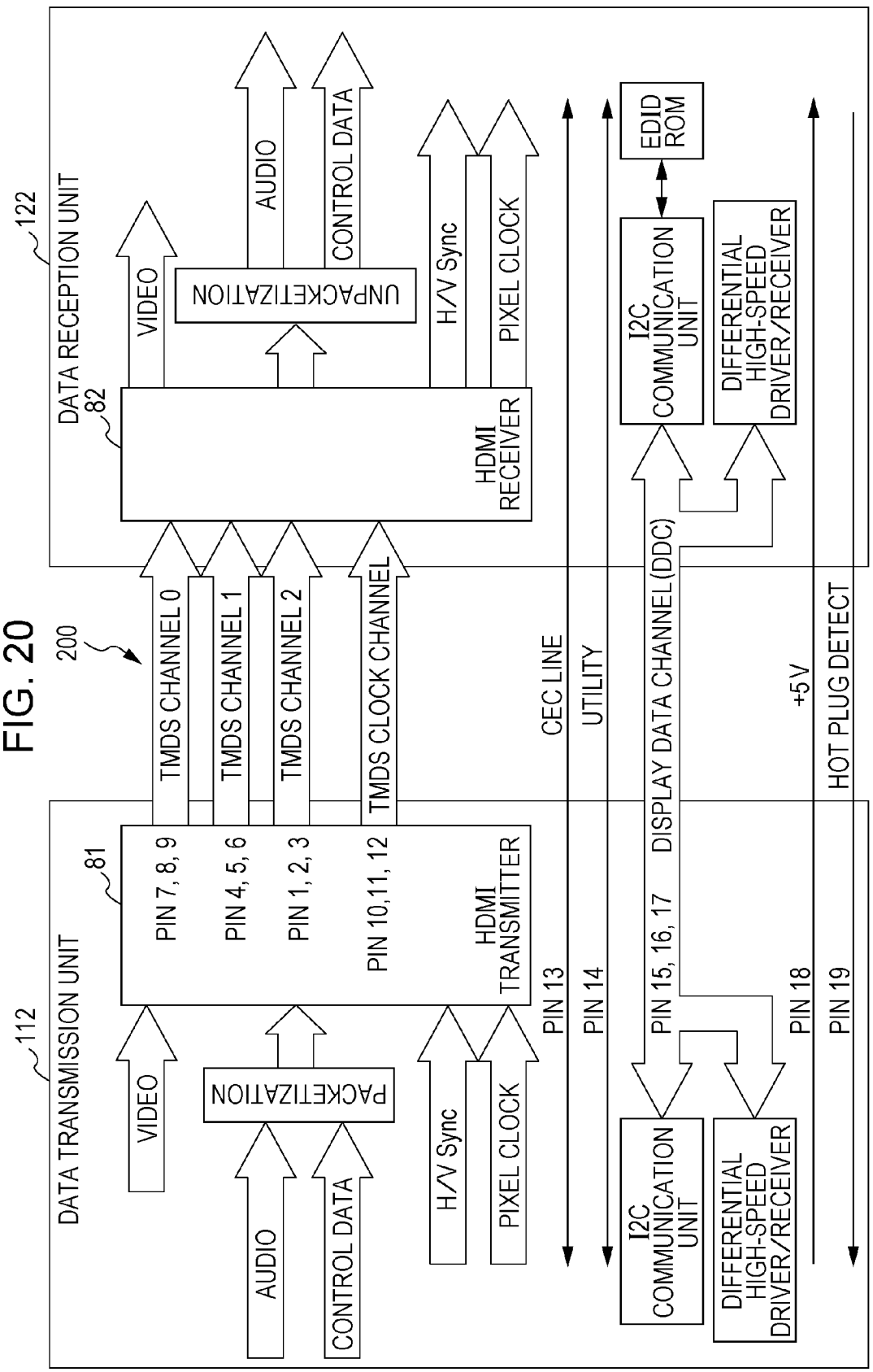

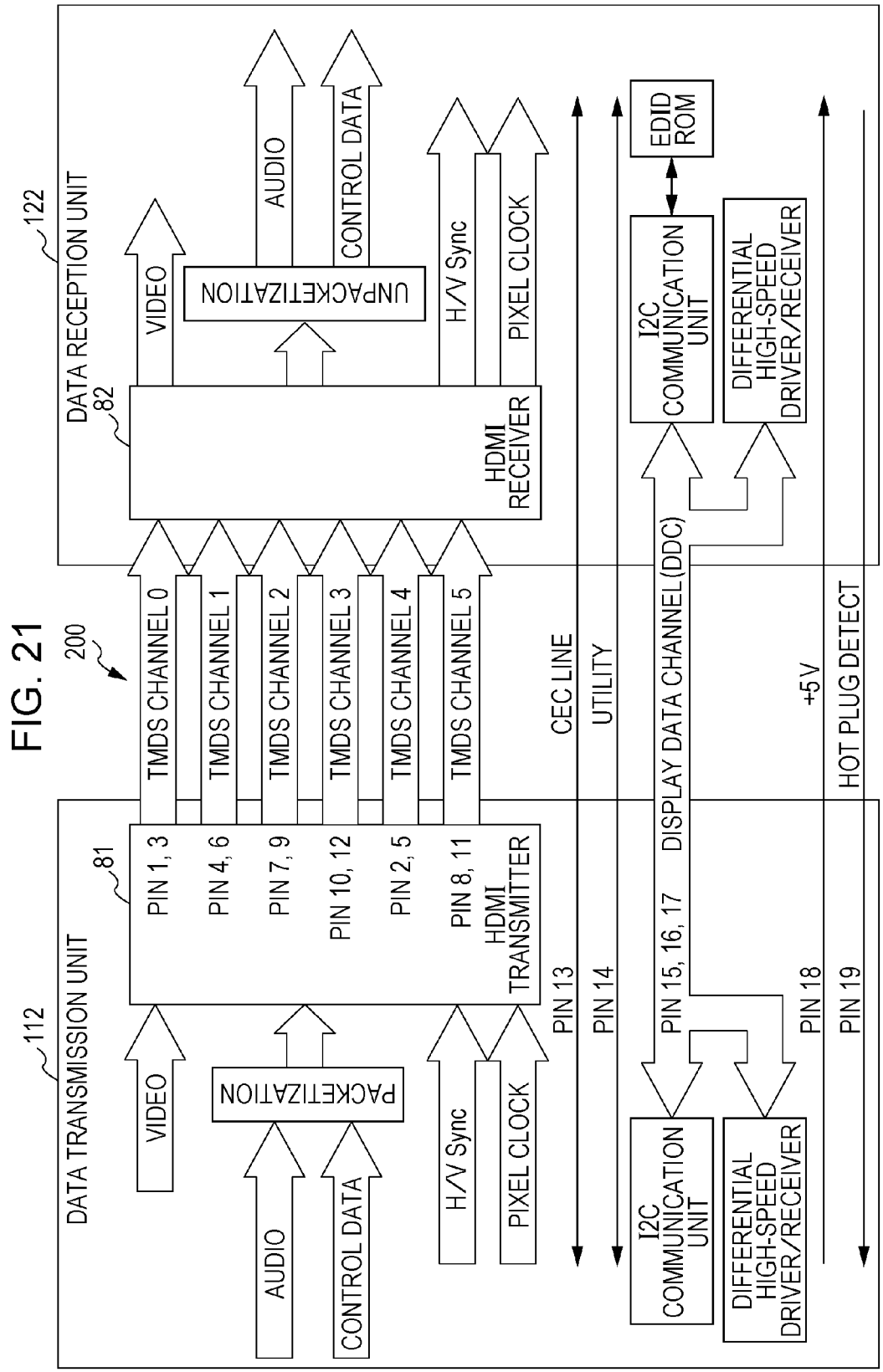

FIG. 22A
(TYPE-A)

| PIN | SIGNAL ASSIGNMENT |
|---|---|
| 1 | TMDS Data2+ |
| 2 | TMDS Data2 Shield |
| 3 | TMDS Data2− |
| 4 | TMDS Data1+ |
| 5 | TMDS Data1 Shield |
| 6 | TMDS Data1− |
| 7 | TMDS Data0+ |
| 8 | TMDS Data0 Shield |
| 9 | TMDS Data0− |
| 10 | TMDS Clock+ |
| 11 | TMDS Clock Shield |
| 12 | TMDS Clock− |
| 13 | CEC |
| 14 | Utility/HEAC+ |
| 15 | SCL/DIFFERENTIAL− |
| 16 | SDA/DIFFERENTIAL+ |
| 17 | DDC/CEC Ground/HEAC Shield |
| 18 | +5 V Power |
| 19 | Hot Plug Detect/HEAC− |

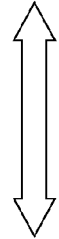

FIG. 22B

| PIN | SIGNAL ASSIGNMENT |
|---|---|
| 1 | TMDS Data0+ |
| 2 | TMDS Data4+ |
| 3 | TMDS Data0− |
| 4 | TMDS Data1+ |
| 5 | TMDS Data4− |
| 6 | TMDS Data1− |
| 7 | TMDS Data2+ |
| 8 | TMDS Data5+ |
| 9 | TMDS Data2− |
| 10 | TMDS Data3+ |
| 11 | TMDS Data5− |
| 12 | TMDS Data3− |
| 13 | CEC |
| 14 | Utility/HEAC+ |
| 15 | SCL/DIFFERENTIAL− |
| 16 | SDA/DIFFERENTIAL+ |
| 17 | DDC/CEC Ground/HEAC Shield |
| 18 | +5 V Power |
| 19 | Hot Plug Detect/HEAC− |

METHOD, APPARATUS AND CABLE FOR ENABLING TWO TYPES OF HDMI COMMUNICATION

CROSS-REFERENCE TO RELATED APPLICATION

The present application is a continuation of U.S. patent application Ser. No. 13/329,766, filed on Dec. 19, 2011, which claims priority from Japanese Patent Application No. JP 2010-292472 filed in the Japanese Patent Office on Dec. 28, 2010, the entire contents of which are incorporated herein by reference.

BACKGROUND

The present disclosure relates to electronic apparatuses, methods for controlling the electronic apparatuses, transmission apparatuses, and reception apparatuses, and particularly relates to an electronic apparatus, a method for controlling the electronic apparatus, a transmission apparatus, and a reception apparatus which are capable of performing communication of a large amount of data.

In recent years, an HDMI (High Definition Multimedia Interface) has been broadly used, which is a de facto standard in the industry, as a digital interface used for connection between CE (Consumer Electronics) apparatuses. For example, "High-Definition Multimedia Interface Specification Version 1.4, Jun. 5 2009" discloses an HDMI standard.

In the HDMI standard, a video signal, an audio signal, and a control signal are transmitted as digital signals using a three-data differential line pair (TMDS (Transition Minimized Differential Signaling) Channel 0/1/2). Furthermore, in HDMI1.4, an HEC (HDMI Ethernet Channel) has been newly defined and enables 100 Base-TX data transmission. Note that "Ethernet" is a registered trademark.

SUMMARY

In markets, apparatuses which are compatible with 1000 Base-T (so-called Gigabit Ethernet (GbE)) have been broadly used and data transmission of 100 Mbps or more has been realized in wired indoor connection. When the HEC in the HDMI is included in a network on the Internet, a portion corresponding to the HEC causes a bottle neck, and therefore, the entire network only allows communication of up to 100 Mbps.

It is desirable to enable communication of a large amount of data using a digital interface such as the HDMI.

According to an embodiment of the present disclosure, there is provided an electronic apparatus including a first communication unit configured to perform I2C bidirectional communication with an external apparatus using two signal lines included in a transmission path as I2C communication lines, a second communication unit configured to perform bidirectional differential communication with the external apparatus using the two signal lines as high-speed data communication lines, a switching unit configured to select a first communication state in which the first communication unit is connected to the two signal lines or a second communication state in which the second communication unit is connected to the two signal lines, and a controller configured to control operation of the switching unit.

In the present disclosure, the first and second communication units which share the two signal lines included in the transmission path are provided. In the first communication unit, the two signal lines are used as the I2C (I square C) communication lines so that the I2C bidirectional communication is performed. The I2C communication lines correspond to a DDC line (an SDA line and an SCL line) of a general HDMI. In the second communication unit, the two signal lines are used as the high-speed data communication lines so that the bidirectional differential communication is performed. For example, in the second communication unit, time-sharing bidirectional differential communication is performed. Accordingly, even in the bidirectional differential communication using the two signal lines, an echo canceller is not used.

The switching unit selectively switches between the first and second communication states. In the first communication state, the first communication unit is connected to the two signal lines, that is, the I2C bidirectional communication is performed using the two signal lines as the I2C communication lines. On the other hand, in the second communication state, the second communication unit is connected to the two signal lines, that is, the bidirectional differential communication is performed using the two signal lines as the high-speed data communication lines.

The controller controls the operation of the switching unit. The switching unit may include a first transistor used to connect the first communication unit and the two signal lines to each other and a second transistor used to connect the second communication unit and the two signal lines to each other. In this case, the first transistor is turned on and the second transistor is turned off when the first communication state is selected and the second transistor is turned on and the first transistor is turned off when the second communication state is selected.

The controller may transmit information on a request for selecting the second communication state to the external apparatus through the transmission path when determining that the external apparatus is compatible with the bidirectional differential communication in accordance with information on capability obtained from the external apparatus by the first communication unit in the first communication state, and may control the switching unit so as to select the second communication state when receiving information on completion of the selection of the second communication state from the external apparatus through the transmission path. In this case, the electronic apparatus serves as a first electronic apparatus which performs communication.

The electronic apparatus further includes a storage unit configured to store capability information. The controller may control the switching unit so as to select the second communication unit when receiving information on a request for selecting the second communication state from the external apparatus through the transmission path after the first communication unit transmits the capability information stored in the storage unit to the external apparatus in the first communication state. In this case, the electronic apparatus serves as a second electronic apparatus which performs the communication.

The controller may determine whether the external apparatus and the transmission path are compatible with the bidirectional differential communication and when the determination is affirmative, the controller may control the switching unit so as to switch from the first communication state to the second communication state. The controller may determine whether the external apparatus is compatible with the bidirectional differential communication in accordance with information on capability of the external apparatus read from the external apparatus through the transmission path. Furthermore, the controller may determine whether the external apparatus is compatible with the bidirectional differential communication by communicating with the external apparatus through the transmission path.

The controller may determine whether the external apparatus is compatible with the bidirectional differential communication using an information provision function of the transmission path which is compatible with the bidirectional differential communication. The information provision function of the transmission path which is compatible with the bidirectional differential communication may be a function of notifying the external apparatus of information representing that the transmission path is compatible with the bidirectional differential communication. The external apparatus may have a function of additionally writing the information transmitted from the transmission path in the capability information of the external apparatus. The controller may determine whether the transmission path is compatible with the bidirectional differential communication in accordance with the capability information read from the external apparatus through the transmission path.

The information provision function of the transmission path which is compatible with the bidirectional differential communication may be a function of updating information representing whether the transmission path is compatible with the bidirectional differential communication such that the information represents that the transmission path is compatible with the bidirectional differential communication among the capability information read from the external apparatus. The controller may determine whether the transmission path is compatible with the bidirectional differential communication in accordance with the capability information read from the external apparatus through the transmission path.

The information provision function of the transmission path which is compatible with the bidirectional differential communication may be a function of providing information representing that the transmission path is compatible with the bidirectional differential communication through near field wireless communication. The controller may determine whether the transmission path is compatible with the second operation mode in accordance with whether the information representing that the transmission path is compatible with the bidirectional differential communication is supplied from the transmission path through the near field wireless communication.

The controller may transmit a differential signal which is a predetermined digital signal to the external apparatus through the two signal lines of the transmission path and determine whether the transmission path is compatible with the bidirectional differential communication in accordance with a signal supplied from the external apparatus. The signal supplied from the external apparatus may represent whether the digital signal received as the differential signal by the external apparatus is correct. Furthermore, the signal supplied from the external apparatus may be a reception digital signal obtained in response to the predetermined differential signal received by the external apparatus.

Accordingly, in the present disclosure, the first communication unit which performs the I2C bidirectional communication or the second communication unit which performs the bidirectional differential communication is selectively connected to the two signal lines included in the transmission path. Therefore, the bidirectional differential communication may be performed without increasing the number of the signal lines included in the transmission path, and accordingly, a large amount of data may be transmitted and received.

According to another embodiment of the present disclosure there is provided a transmission apparatus including a digital signal transmission unit configured to transmit a digital signal to an external apparatus through a transmission path using a differential signal, have a first operation mode in which the number of channels for the differential signal is set to a first number, and have a second operation mode in which the number of channels for the differential signal is set to a second number which is larger than the first number, an operation mode determination unit configured to determine whether the external apparatus and the transmission path are compatible with the second operation mode, an operation controller configured to control the operation of the digital signal transmission unit in accordance with the determination performed by the operation mode determination unit, a first communication unit configured to perform I2C bidirectional communication with the external apparatus using two signal lines included in the transmission path as I2C communication lines, a second communication unit configured to perform bidirectional differential communication with the external apparatus using the two signal lines as high-speed data communication lines, a switching unit configured to switch between a first communication state in which the first communication unit is connected to the two signal lines and a second communication state in which the second communication unit is connected to the two signal lines, and a switch controller configured to control the operation of the switching unit.

According to the present disclosure, the digital signal transmission unit transmits a digital signal to the external apparatus (reception apparatus) through the transmission path using a differential signal. The digital signal transmission unit has first and second operation modes and one of the first and second operation modes is selectively used. The number of channels for the differential signal is set to the first number in the first operation mode and set to the second number which is larger than the first number in the second operation mode. For example, the first operation mode corresponds to a general HDMI operation mode and the first number corresponds to 3 whereas the second operation mode corresponds to a new HDMI operation mode and the second number corresponds to 6 which is larger than 3.

The operation mode determination unit determines whether the external apparatus and the transmission path are compatible with the second operation mode. Then, the operation controller controls the operation of the digital signal transmission unit in accordance with the determination. Since the second operation mode (new HDMI standard) is used, signal transmission may be performed in high data rate. Furthermore, when the external apparatus and the transmission path are not compatible with the second operation mode, the first operation mode (general HDMI standard) is used so that backward compatibility is ensured.

Furthermore, in the present disclosure, the first and second communication units which share the two signal lines included in the transmission path are provided. In the first communication unit, the two signal lines are used as the I2C communication lines so that the I2C bidirectional communication is performed. The I2C communication lines correspond to a DDC line (an SDA line and an SCL line) of a general HDMI. In the second communication unit, the two signal lines are used as the high-speed data communication lines so that the bidirectional differential communication is performed.

The switching unit selectively switches between the first and second communication states. In the first communication state, the first communication unit is connected to the two signal lines, that is, the I2C bidirectional communication is performed using the two signal lines as the I2C communication lines. On the other hand, in the second communication state, the second communication unit is connected to the two signal lines, that is, the bidirectional differential communication is performed using the two signal lines as the high-speed data communication lines.

The switch controller controls the operation of the switching unit. Since the first communication unit which performs the I2C bidirectional communication or the second communication unit which performs the bidirectional differential communication is selectively connected to the two signal lines included in the transmission path, the bidirectional differential communication may be performed without increase of the number of signal lines included in the transmission path, and accordingly, a large amount of data may be transmitted to and received from the external apparatus (reception apparatus).

According to still another embodiment of the present disclosure, there is provided a reception apparatus including a digital signal reception unit configured to receive a digital signal from an external apparatus through a transmission path using a differential signal, have a first operation mode in which the number of channels for the differential signal is set to a first number, and have a second operation mode in which the number of channels for the differential signal is set to a second number which is larger than the first number, an information reception unit configured to receive operation mode information representing an operation mode to be selected from among the first and second operation modes, an operation controller configured to control the operation of the digital signal reception unit in accordance with the operation mode information received by the information reception unit, a first communication unit configured to perform I2C bidirectional communication with the external apparatus using two signal lines included in the transmission path as I2C communication lines, a second communication unit configured to perform bidirectional differential communication with the external apparatus using the two signal lines as high-speed data communication lines, a switching unit configured to switch between a first communication state in which the first communication unit is connected to the two signal lines and a second communication state in which the second communication unit is connected to the two signal lines, and a switch controller configured to control the operation of the switching unit.

According to the present disclosure, the digital signal reception unit receives a digital signal from the external apparatus (reception apparatus) through the transmission path using a differential signal. The digital signal reception unit has first and second operation modes and one of the first and second operation modes is selectively used. The number of channels for the differential signal is set to the first number in the first operation mode and set to the second number which is larger than the first number in the second operation mode. For example, the first operation mode corresponds to a general HDMI operation mode and the first number corresponds to 3 whereas the second operation mode corresponds to a new HDMI operation mode and the second number corresponds to 6 which is larger than 3.

The information reception unit receives the operation mode information representing an operation mode to be selected from among the first and second operation modes from the external apparatus. Then, the operation controller controls the operation of the digital signal reception unit in accordance with the operation mode information received by the information reception unit. In this case, the operation mode of the digital signal reception unit may easily correspond to the operation mode of the digital signal transmission mode of the external apparatus, and a digital signal may be smoothly received from the external apparatus.

Furthermore, in the present disclosure, the first and second communication units which share the two signal lines included in the transmission path are provided. In the first communication unit, the two signal lines are used as the I2C communication lines so that the I2C bidirectional communication is performed. The I2C communication lines correspond to a DDC line (an SDA line and an SCL line) of a general HDMI. In the second communication unit, the two signal lines are used as the high-speed data communication lines so that the bidirectional differential communication is performed.

The switching unit selectively switches between the first and second communication states. In the first communication state, the first communication unit is connected to the two signal lines, that is, the I2C bidirectional communication is performed using the two signal lines as the I2C communication lines. On the other hand, in the second communication state, the second communication unit is connected to the two signal lines, that is, the bidirectional differential communication is performed using the two signal lines as the high-speed data communication lines.

The switch controller controls the operation of the switching unit. Since the first communication unit which performs the I2C bidirectional communication or the second communication unit which performs the bidirectional differential communication is selectively connected to the two signal lines included in the transmission path, the bidirectional differential communication may be performed without increase of the number of signal lines included in the transmission path, and accordingly, a large amount of data may be transmitted to and received from the external apparatus (transmission apparatus).

According to a further embodiment of the present disclosure, there is provided a cable including two signal lines capable of functioning as high-speed data communication lines for bidirectional differential communication. The cable includes an information provision function unit configured to provide information representing signal transmission capability of the cable to a connected apparatus.

According to the present disclosure, the first communication unit which performs the I2C bidirectional communication or the second communication unit which performs the bidirectional differential communication is selectively connected to the two signal lines included in the transmission path. Therefore, the bidirectional differential communication may be performed without increasing the number of the signal lines included in the transmission path, and accordingly, a large amount of data may be transmitted and received.

BRIEF DESCRIPTION OF THE DRAWINGS

FIGS. 6A and 6B are diagrams illustrating comparison of pin assignment of a general HDMI (Type A) with pin assignment of a new HDMI;

FIG. 14 is a diagram illustrating flag information newly defined in an EDID;

FIG. 20 is a diagram illustrating a configuration of the data transmission unit of the source apparatus and a configuration of the data reception unit of the sink apparatus (in a three-channel mode using a bidirectional differential communication function);

FIG. 21 is a diagram illustrating a configuration of the data transmission unit of the source apparatus and a configuration of the data reception unit of the sink apparatus (in a six-channel mode using a bidirectional differential communication function);

FIGS. 22A and 22B are diagrams illustrating comparison of assignment of the receptacle pins in the three-channel mode with assignment of the receptacle pins in the six-channel mode;

DETAILED DESCRIPTION OF EMBODIMENTS

Embodiments of the present disclosure will be described hereinafter. Note that the description will be made in the following order.

1. Embodiment
2. Modification

1. Embodiment

Configuration of AV System

Figure 1:
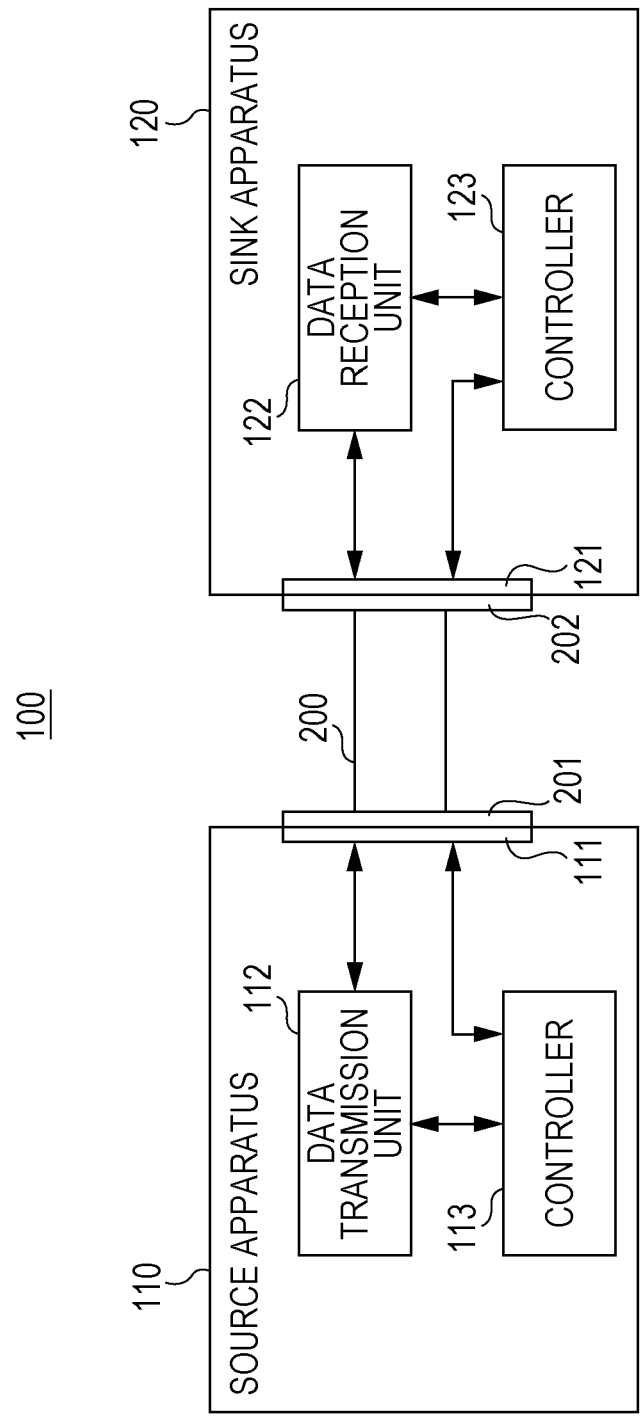
FIG. 1 is a block diagram illustrating a configuration of an AV system according to an embodiment of the present disclosure.

FIG. 1 is a diagram illustrating a configuration of an AV (Audio and Visual) system 100 according to an embodiment. The AV system 100 includes a source apparatus 110 and a sink apparatus 120 which are connected to each other. The source apparatus 110 is an AV source such as a game machine, a disk player, a set top box, a digital still camera, or a cellular phone. The sink apparatus 120 is a television receiver, a projector, or the like.

The source apparatus 110 and the sink apparatus 120 are connected to each other through a cable 200. The source apparatus 110 includes a receptacle 111 which is included in a connector and which is connected to a data transmission unit 112. The sink apparatus 120 includes a receptacle 121 which is included in another connector and which is connected to a data reception unit 122. Furthermore, the cable 200 has a plug 201 included in the connector at one end thereof and has a plug 202 included in the other connector at the other end thereof. The plug 201 positioned at the one end of the cable 200 is connected to the receptacle 111 included in the source apparatus 110 and the plug 202 positioned at the other end of the cable 200 is connected to the receptacle 121 included in the sink apparatus 120.

The source apparatus 110 includes a controller 113. The controller 113 controls entire operation of the source apparatus 110. In this embodiment, the data transmission unit 112 included in the source apparatus 110 is compatible with a general HDMI and a new HDMI. When determining that the cable 200 and the sink apparatus 120 are compatible with the new HDMI, the controller 113 controls the data transmission unit 112 so that the data transmission unit 112 operates in an operation mode corresponding to the new HDMI. On the other hand, when at least determining that the sink apparatus 120 is only compatible with the general HDMI or determining that the cable 200 is compatible with the general HDMI, the controller 113 controls the data transmission unit 112 so that the data transmission unit 112 operates in an operation mode corresponding to the general HDMI.

The source apparatus 120 includes a controller 123. The controller 123 controls entire operation of the sink apparatus 120. In this embodiment, the data reception unit 122 included in the sink apparatus 120 is only compatible with the general HDMI or is compatible with both of the general HDMI and the new HDMI. When the data reception unit 122 is compatible with both of the general HDMI and the new HDMI, the controller 123 controls the data reception unit 122 so that the data reception unit 122 operates in an operation mode the same as that of the data transmission unit 112 included in the source apparatus 110. In this case, the controller 123 controls the operation mode of the data reception unit 122 in accordance with a result of a determination of an operation mode transmitted from the source apparatus 110 through a line such as a CEC line. The cable 200 is compatible with the general HDMI or the new HDMI.

Figure 2:
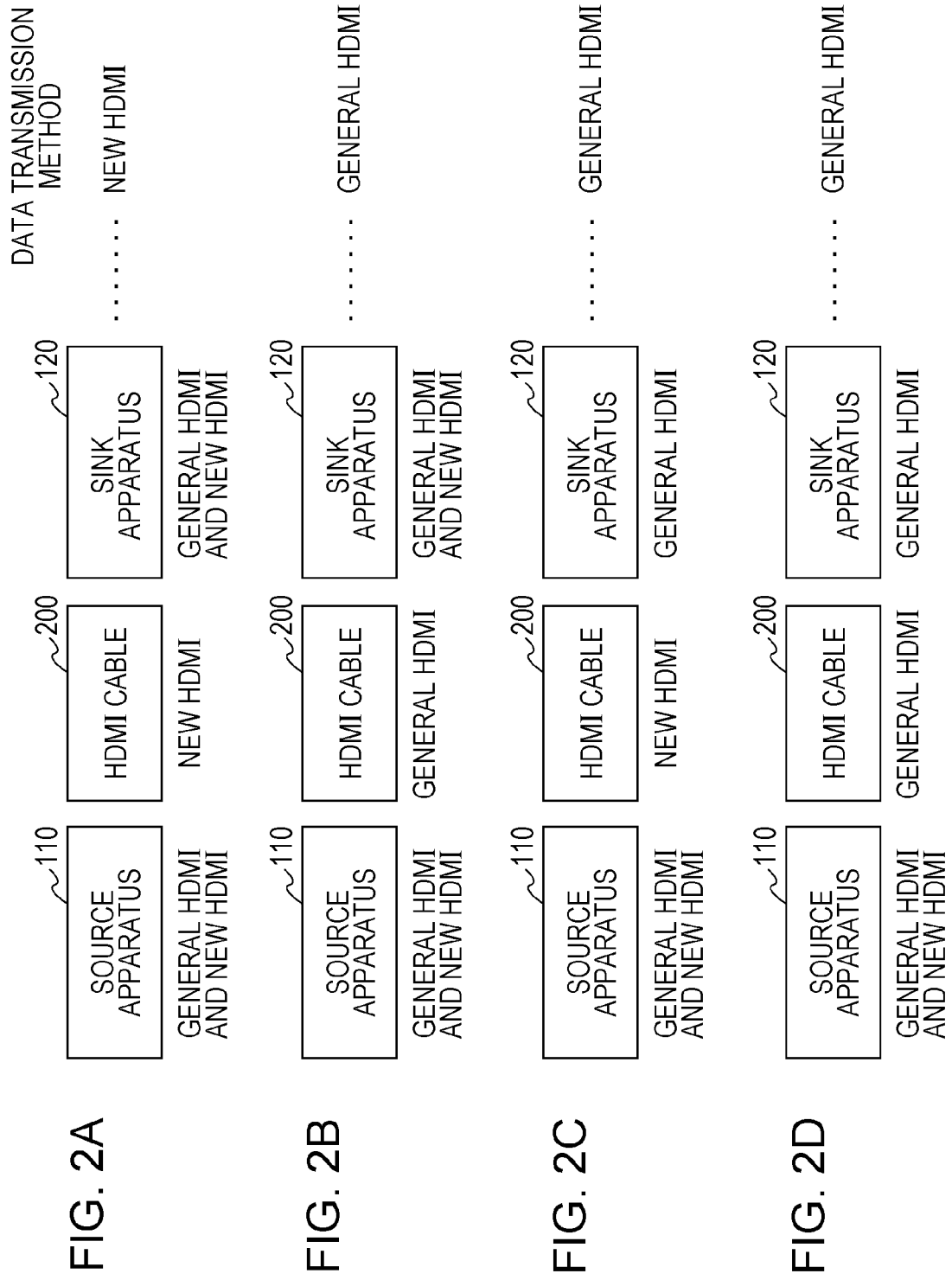
FIGS. 2A to 2D are diagrams illustrating combinations of a source apparatus, an HDMI cable, and a sink apparatus.

In the AV system 100 shown in FIG. 1, as shown in FIG. 2A, when the cable 200 is compatible with the new HDMI and the sink apparatus 120 is compatible with both of the general HDMI and the new HDMI, data transmission is performed by the new HDMI. In this case, the data transmission unit 112 included in the source apparatus 110 and the data reception unit 122 included in the sink apparatus 120 are controlled so as to be operated in operation modes corresponding to the new HDMI.

Furthermore, in the AV system 100 shown in FIG. 1, as shown in FIGS. 2B to 2D, at least when the cable 200 is only compatible with the general HDMI or the sink apparatus 120 is only compatible with the general HDMI, data transmission is performed by the general HDMI. In this case, the data transmission unit 112 included in the source apparatus 110 is controlled so as to be operated in an operation mode corresponding to the general HDMI. Furthermore, the data reception unit 122 which is included in the sink apparatus 120 and which is compatible with both of the general HDMI and the new HDMI is controlled so as to be operated in an operation mode corresponding to the general HDMI. Note that, in the case shown in FIG. 2B, if the cable 200 may perform data transmission using the new HDMI with a low data transmission rate, for example, the data transmission in a new HDMI mode may be performed.

Configurations of Data Transmission Unit and Data Reception Unit

Figure 3:
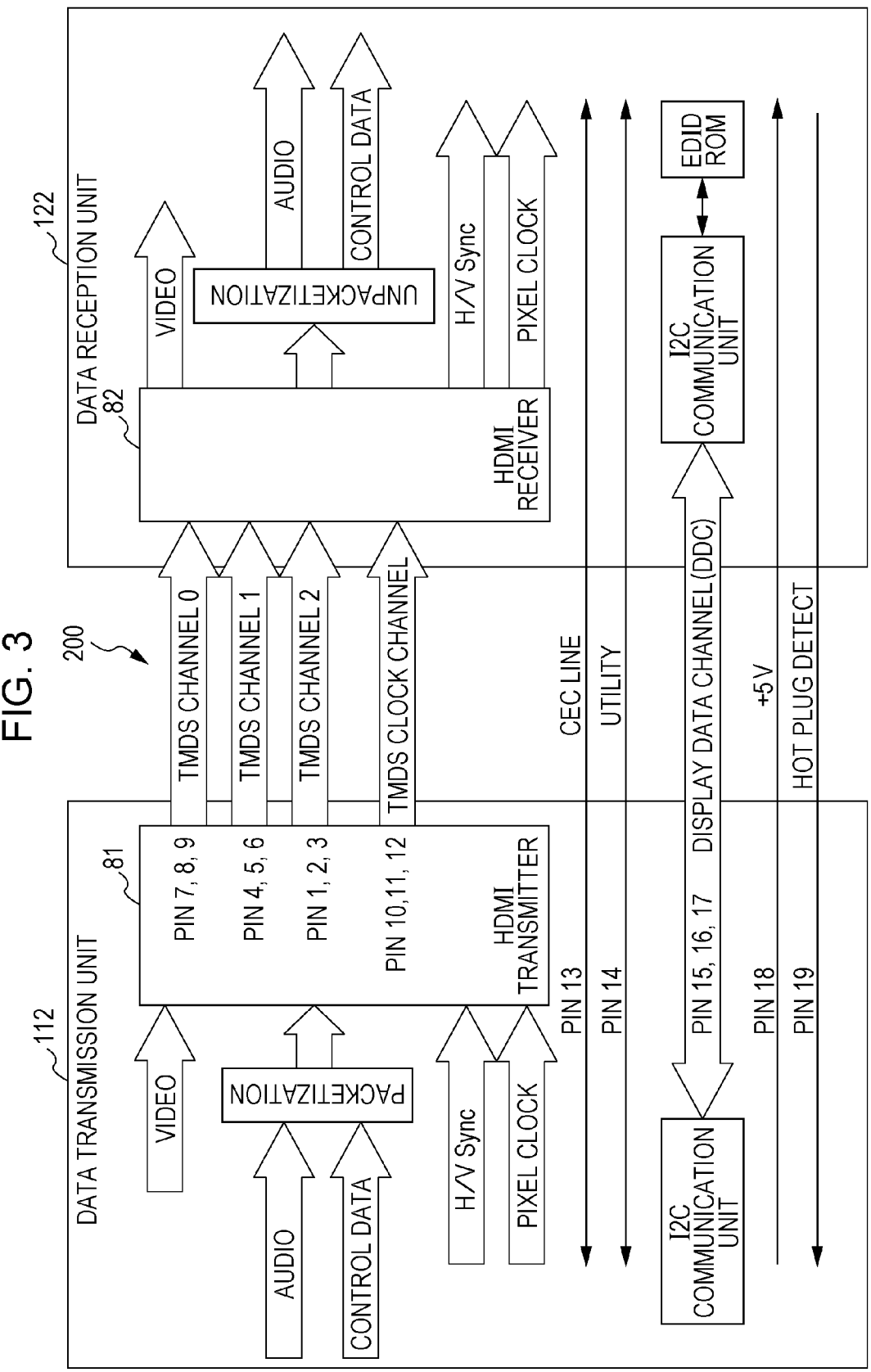
FIG. 3 is a diagram illustrating a configuration of a data transmission unit of the source apparatus and a data reception unit of the sink apparatus (in a general HDMI operation mode)
Figure 4:
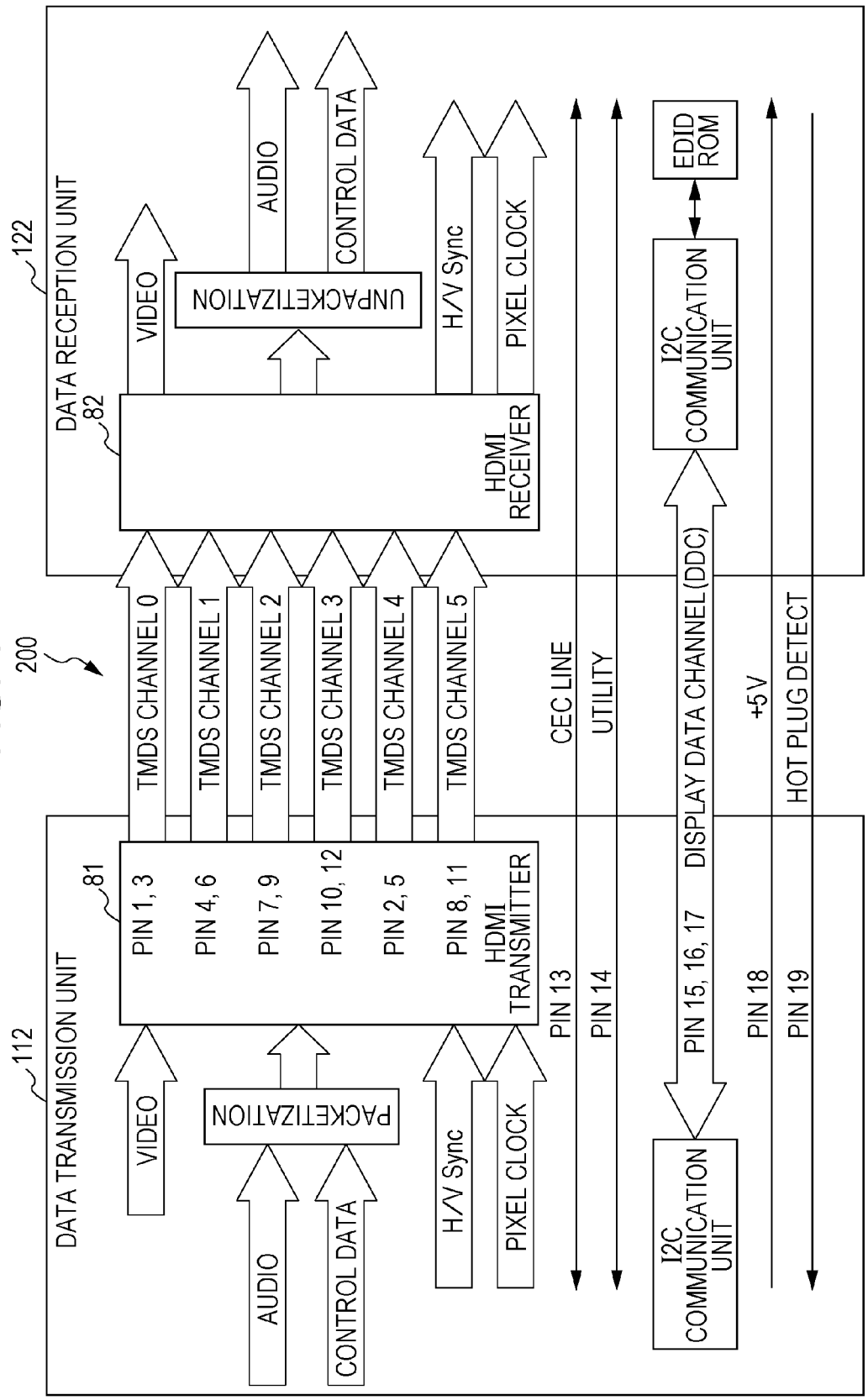
FIG. 4 is a diagram illustrating a configuration of a data transmission unit of the source apparatus and a data reception unit of the sink apparatus (in a new HDMI operation mode)

FIGS. 3 and 4 are diagrams illustrating configurations of the data transmission unit 112 included in the source apparatus 110 and the data reception unit 122 included in the sink apparatus 120 which are included in the AV system 100 shown in FIG. 1. The data transmission unit 112 transmits a differential signal corresponding to video data for one screen which is not compressed in an effective image interval (which is also referred to as an "active video interval") in a plurality of channels to the data reception unit 122 in an one-way manner.

Here, the effective image interval is obtained by subtracting a horizontal blanking interval and a vertical blanking interval from an interval from a certain vertical synchronization signal to the next vertical synchronization signal. Furthermore, the data transmission unit 112 transmits differential signals corresponding to at least audio data and control data which are associated with video data and corresponding to other auxiliary data to the data reception unit 122 in a plurality of channels in the horizontal blanking interval or the vertical blanking interval in an one-way manner.

The data reception unit 122 receives the differential signal corresponding to the video data transmitted from the data reception unit 122 in the one-way manner in the plurality of channels in the active video interval. Furthermore, the data reception unit 122 receives the differential signals corresponding to the audio data and the control data which are transmitted from the data transmission unit 112 in the one-way manner in the plurality of channels in the horizontal blanking interval or the vertical blanking interval.

Examples of a transmission channel of an HDMI system including the data transmission unit 112 and the data reception unit 122 will be described below. First, the examples of the transmission channel include differential signal channels (a TMDS channel and a TMDS clock channel). Three differential signal channels are used to transmit a digital signal such as the video data in the general HDMI whereas six differential signal channels are used in the new HDMI.

The differential signal channels in the general HDMI will be described. As shown in FIG. 3, three TMDS channels 0 to 2 are used as transmission channels to perform one-way serial transmission of the video data and the audio data from the data transmission unit 112 to the data reception unit 122 in synchronization with a pixel clock. Furthermore, a TMDS clock channels is used as a transmission channel to transmit a TMDS clock.

An HDMI transmitter 81 included in the data transmission unit 112 converts video data which is not compressed into a corresponding differential signal, for example, and transmits the differential signal to the data reception unit 122 connected through the cable 200 through the three TMDS channels 0 to 2 in an one-way manner. Furthermore, the HDMI transmitter 81 converts audio data, important control data, and other auxiliary data which are associated with the video data which is not compressed into corresponding differential signals and transmits the differential signals in series to the data reception unit 122 through the three TMDS channels 0 to 2 in an one-way manner.

Moreover, the HDMI transmitter 81 transmits a TMDS clock to the data reception unit 122 through the TMDS clock channel in synchronization with the video data transmitted through the three TMDS channels 0 to 2. Here, using a TMDS channel i (i is 0, 1, or 2), video data of 10 bits is transmitted in one clock of the TMDS clock.

An HDMI receiver 82 included in the data reception unit 122 receives the differential signal corresponding the video data and differential signals corresponding to the audio data and the control data which are transmitted from the data transmission unit 112 through the TMDS channels 0 to 2 in the one-way manner. In this case, the differential signals are received in synchronization with the pixel clock (TMDS clock) transmitted from the data transmission unit 112 through the TMDS clock channel.

Next, the differential signal channels in the new HDMI will be described. As shown in FIG. 4, six TMDS channels 0 to 5 are used as transmission channels to perform one-way serial transmission of video data and audio data from the data transmission unit 112 to the data reception unit 122 in synchronization with a pixel clock. Note that, in the new HDMI, transmission of a TMDS clock is omitted, and a self-clock method for reproducing a clock from reception data is employed on a reception side.

The HDMI transmitter 81 included in the data transmission unit 112 converts video data which is not compressed into a corresponding differential signal, for example, and transmits the differential signal to the data reception unit 122 connected through the cable 200 through the six TMDS channels 0 to 5 in an one-way manner. Furthermore, the HDMI transmitter 81 converts audio data, important control data, and other auxiliary data which are associated with the video data which is not compressed into corresponding differential signals and transmits the differential signals in series to the data reception unit 122 through the six TMDS channels 0 to 5 in an one-way manner.

An HDMI receiver 82 included in the data reception unit 122 receives the differential signal corresponding the video data and differential signals corresponding to the audio data and the control data which are transmitted from the data transmission unit 112 in the one-way manner through the TMDS channels 0 to 5. In this case, the HDMI receiver 82 reproduces a pixel clock from reception data and performs the reception in synchronization with the pixel clock (TMDS clock).

Examples of the transmission channels in the HDMI system include, in addition to the TMDS channels and the TMDS clock channel described above, a DDC (Display Data Channel) line, a CEC (Consumer Electronics Control) line. The DDC line includes two signal lines that is, an SDA line and an SCL line, which are not shown and which are included in the cable 200.

In the DDC line, the two signal lines are used as I2C (Inter-Integrated Circuit) communication lines so that I2C bidirectional communication is performed. Therefore, in each of the data transmission unit 112 and the data reception unit 122, an I2C communication unit is connected to the two signal lines.

The DDC line is used by the data transmission unit 112 to read E-EDID (Enhanced Extended Display Identification Data) from the data reception unit 122, for example. Specifically, the data reception unit 122 includes, in addition to the HDMI receiver 82, an EDID ROM (EEPROM) which stores the E-EDID representing information on capability (configuration/capability) of the data reception unit 122. The data transmission unit 112 reads the E-EDID from the data reception unit 122 connected thereto through the cable 200 using the DDC line in response to a request issued by the controller 113, for example.

Furthermore, the DDC line is also used to transmit and receive information for device authentication and key exchange in an HDCP (High-bandwidth Digital Content Protection) system for copyright protection.

The data transmission unit 112 transmits the read E-EDID to the controller 113. The controller 113 stores the E-EDID in a flash ROM or a DRAM not shown. The controller 113 may recognize a setting of the capability of the data reception unit 122 with reference to the E-EDID. The controller 113 recognizes, for example, whether the sink apparatus 120 including the data reception unit 122 is compatible with the new HDMI as well as the general HDMI. The CEC line includes one signal line, not shown, included in the cable 200 and is used to perform bidirectional communication of control data between the data transmission unit 112 and the data reception unit 122.

Furthermore, the cable 200 includes a line (HPD line) connected to a pin which is referred to as "HPD (Hot Plug Detect)". The source apparatus may detect connection of the sink apparatus making use of the HPD line. Note that the HPD line is also used as an HEAC− line included in a bidirectional communication path. Furthermore, the cable 200 includes a power supply line (+5V Power Line) used to supply electric power from the source apparatus to the sink apparatus. Moreover, the cable 200 includes a utility line. The utility line is also used as an HEAC+ line included in the bidirectional communication path.

Figure 5:
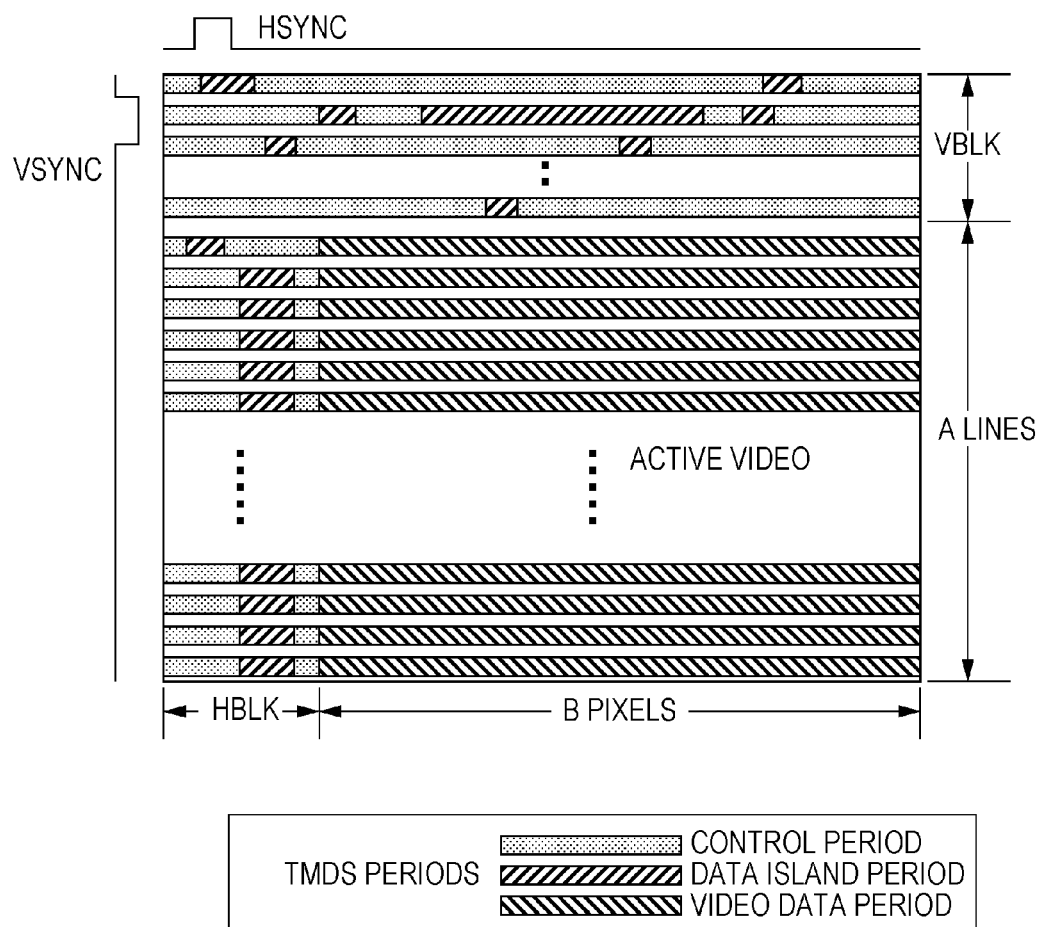
FIG. 5 is a diagram illustrating a configuration of TMDS transmission data.

FIG. 5 is a diagram illustrating a configuration of TMDS transmission data. FIG. 5 shows periods of various transmission data when image data having a matrix of columns of B pixels and rows of A lines is transmitted through the TMDS channels 0 to 2 or the TMDS channels 0 to 5. A video field in which transmission data is transmitted through TMDS channels of the HDMI includes three periods categorized in accordance with a type of the transmission data. The three periods include a video data period, a data island period, and a control period.

Here, the video field period is started from an active edge of a certain vertical synchronization signal and is continued until an active edge of the next vertical synchronization signal. The video field period is divided into a horizontal blanking period, a vertical blanking period, and an active video period. A video data period obtained by subtracting the horizontal blanking period and the vertical blanking period from the video field period is assigned to the active video period. In the video data period, data having active pixels in a matrix of B pixels X A lines which constitute image data for one screen which is not compressed is transmitted.

The data island period and the control period are assigned to the horizontal blanking period and the vertical blanking period. In the data island period and the control period, auxiliary data is transmitted. Specifically, the data island period is assigned to portions of the horizontal blanking period and the vertical blanking period. In the data island period, a packet of audio data which is not associated with control among the auxiliary data is transmitted, for example. The control period is assigned to other portions of the horizontal blanking period and the vertical blanking period. In the control period, a vertical synchronization signal, a horizontal synchronization signal, a control packet, and the like which are associated with the control among the auxiliary data are transmitted, for example.

Here, pin assignment of the receptacle 111 will be described. First, pin assignment (type A) of the general HDMI will be described. The pin assignment of the general HDMI serves as first pin assignment. FIG. 6A shows the pin assignment of the general HDMI. TMDS Data i+ and TMDS Data i− which are differential signals of a TMDS channel i (i is 0, 1, or 2) are transmitted through two lines which are differential lines. Pins 7, 4, and are assigned to the TMDS Data i+ and pins 9, 6, and 3 are assigned to the TMDS Data i−. Note that pins 8, 5, and 2 are assigned to TMDS Data i Shield (i is 0, 1, or 2).

TMDS Clock+ and TMDS Clock− which are differential signals of the TMDS clock channel are transmitted through two lines which are differential lines. A pin 10 is assigned to the TMDS Clock+ and a pin 12 is assigned to a TMDS Clock−. Note that a pin 11 is assigned to a TMDS Clock Shield.

Furthermore, a CEC signal serving as control data is transmitted through the CEC line. A pin 13 is assigned to the CEC signal. Furthermore, an SDA (Serial Data) signal such as the E-EDID is transmitted through the SDA line. A pin 16 is assigned to the SDA signal. Moreover, an SCL (Serial Clock) signal which is a clock signal used for synchronization at a time of transmission/reception of the SDA signal is transmitted through the SCL line. A pin 15 is assigned to the SCL signal.

A pin 19 is assigned to an HPD/HEAC−. A pin 14 is assigned to utility/HEAC+. A pin 17 is assigned to DDC/CEC Ground/HEAC Shield. Furthermore, a pin 18 is assigned to a power source (+5V power).

Next, pin assignment of the new HDMI will be described. The pin assignment of the new HDMI serves as second pin assignment. FIG. 6B shows the pin assignment of the new HDMI. TMDS Data i+ and TMDS data i− which are differential signals of a TMDS channel i (i is 0, 1, 2, 3, 4 or 5) are transmitted through two lines which are differential lines. Pins 1, 4, 7, 10, 2, and 8 are assigned to the TMDS data i+ and pins 3, 6, 9, 12, 5, and 11 are assigned to the TMDS data i−.

Furthermore, a CEC signal serving as control data is transmitted through the CEC line. A pin 13 is assigned to the CEC signal. Furthermore, an SDA (Serial Data) signal such as the E-EDID is transmitted through the SDA line. A pin 16 is assigned to the SDA signal. Moreover, an SCL (Serial Clock) signal which is a clock signal used for synchronization at a time of transmission/reception of the SDA signal is transmitted through the SCL line. A pin 15 is assigned to the SCL signal. Note that the DDC line described above includes the SDA line and the SCL line.

A pin 19 is assigned to an HPD/HEAC−. A pin 14 is assigned to utility/HEAC+. A pin 17 is assigned to DDC/CEC Ground/HEAC Shield. Furthermore, a pin 18 is assigned to a power source (+5V power).

As described above, in the new HDMI pin assignment (shown in FIG. 6B), the terminals (pins 2, 5, 8, and 11) used as the shield terminals in the general HDMI pin assignment (refer to FIG. 6A) are used as data terminals. Furthermore, in the new HDMI pin assignment, the terminals (pins 10 and 12) used as the signal terminals for the differential signals of the clock signals in the general HDMI pin assignment are used as data terminals.

When operating in a general HDMI operation mode, the data transmission unit 112 of the source apparatus 110 selects the general HDMI pin assignment shown in FIG. 6A whereas when operating in a new HDMI operation mode, the data transmission unit 112 selects the new HDMI pin assignment shown in FIG. 6B. Note that, the pin assignment of the receptacle 111 of the source apparatus 110 has been described hereinabove. Although a detailed description is omitted, pin assignment of the receptacle 121 of the sink apparatus 120 has the same configuration when the data reception unit 122 of the sink apparatus 120 is compatible with both of the general HDMI and the new HDMI.

Figure 7A:
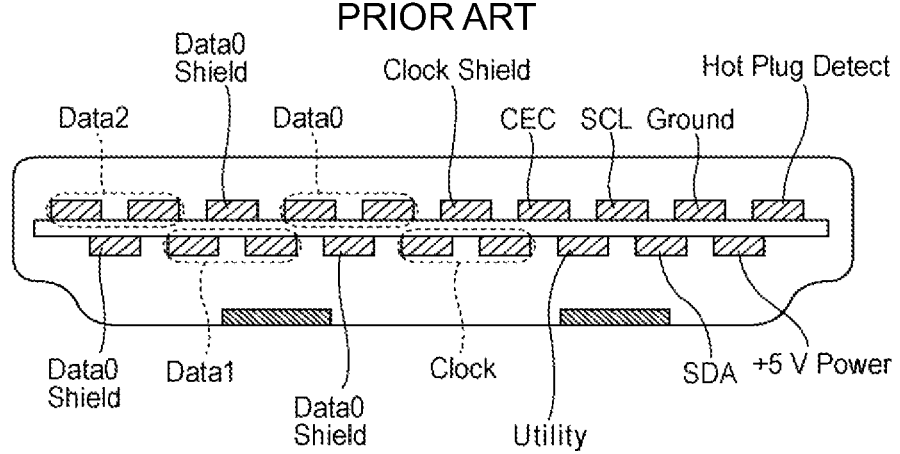
FIG. 7A is a diagram illustrating arrangement of receptacle pins of a source apparatus and a sink apparatus of the general HDMI and FIG. 7B is a diagram illustrating arrangement of receptacle pins of a source apparatus and a sink apparatus of the new HDMI.
Figure 7B:
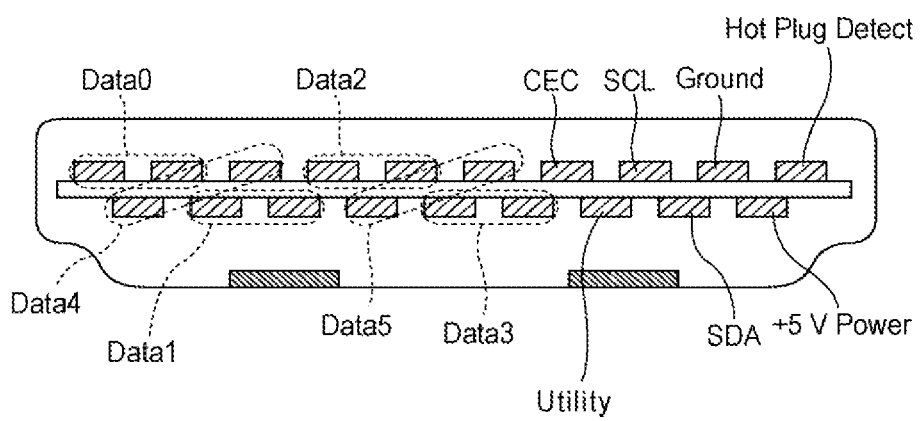

FIGS. 7A and 7B show pin arrangement of the receptacle 111 of the source apparatus 110. FIG. 7A shows pin arrangement of the general HDMI and FIG. 7B shows pin arrangement of the new HDMI. Note that, when the general HDMI pin assignment is selected for the receptacle 111, the pins 2, 5, 8, and 11 are in the following states. That is, the pins 2, 5, 8, and 11 are in ground states in the source apparatus 110 and in the sink apparatus 120, the pins 2, 5, 8, and 11 are the ground states in the sink apparatus 120 and high-impedance states in the source apparatus 110, or the pins 2, 5, 8, and 11 are in high-impedance states in the sink apparatus 120 and in the ground states in the source apparatus 110. Note that, although detailed description is omitted, the pin assignment of the receptacle 121 of the sink apparatus 120 has the same configuration when the data reception unit 122 of the sink apparatus 120 is compatible with both of the general HDMI and the new HDMI.

Figure 8A:
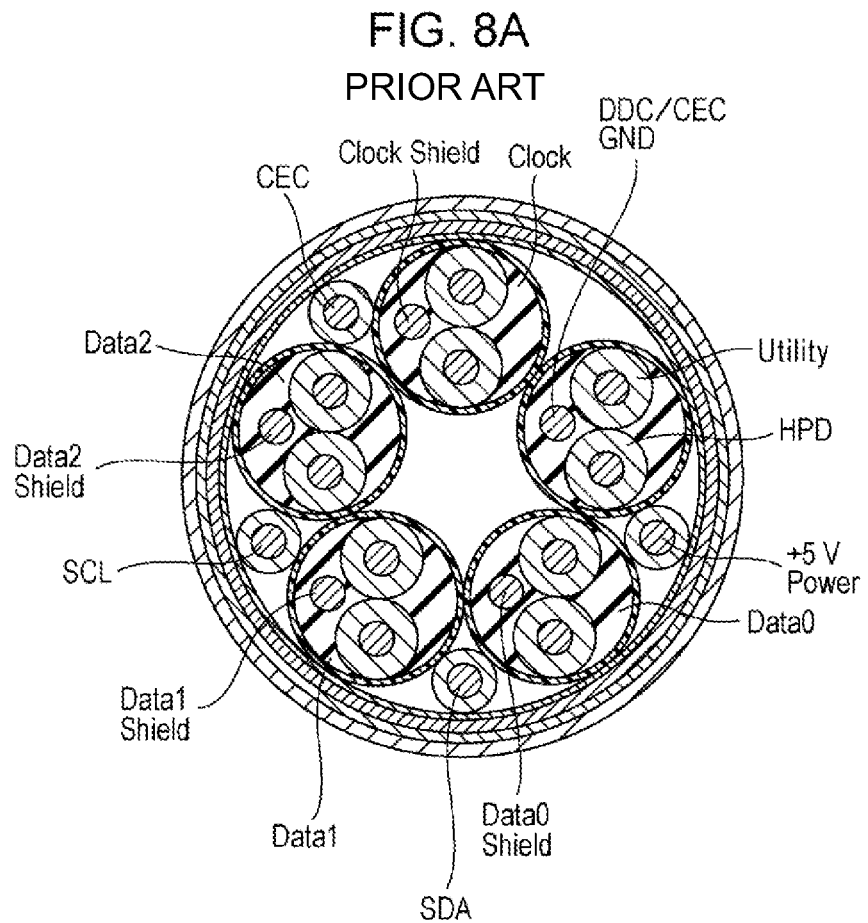
FIGS. 8A and 8B are diagrams illustrating a configuration of a general HDMI cable.

FIG. 8A shows a configuration of a general HDMI cable used as the cable 200. In the general HDMI cable, three pairs of data lines are configured as shield twisted pair units so as to attain properties of the three data line pairs. Furthermore, a pair of clock lines and a combination of the utility line and the HPD line for an HEAC function are also configured as shield twisted pair units.

Figure 8B:
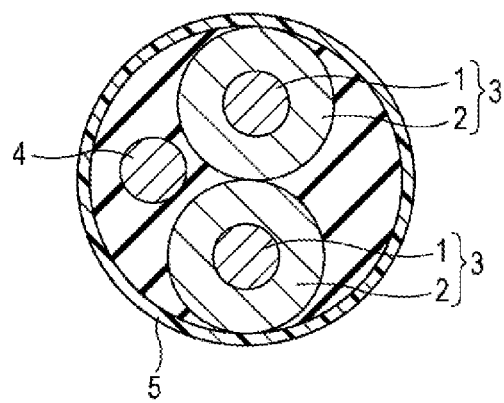

FIG. 8B shows a configuration of a shield twisted pair unit. The shield twisted pair unit includes two electric cables 3, a drain line 4, and a shield member 5 which encloses the electric cables 3 and the drain line 4. Note that each of the electric cables 3 has a core line 1 and a cover portion 2 which covers the core line 1.

In the general HDMI cable, drain lines included in the shield twisted pair units of the data and the clock are connected to pins of plugs attached to end portions of this cable. In this case, the drain lines are connected to pins (terminals) corresponding to the shield terminals (shield pins 2, 5, 8, and 11) of the receptacle described above (in the pin arrangement of the general HDMI). The shield terminals are grounded in the source apparatus 110 and the sink apparatus 120. Therefore, the drain lines included in the shield twisted pair units of the data and the clock are brought to grounded states when the plugs are connected to the receptacles (pin arrangement of the general HDMI).

Figure 9:
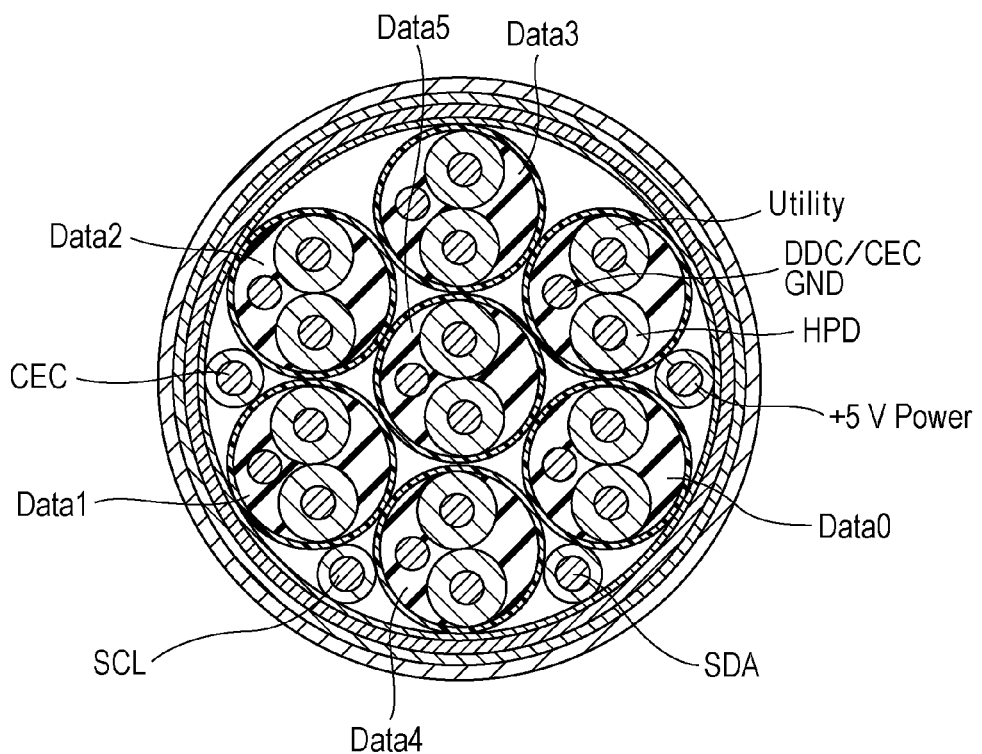
FIG. 9 is a diagram illustrating a configuration of a new HDMI cable.

FIG. 9 shows a configuration of a new HDMI cable used as the cable 200. In the new HDMI cable, six pairs of data lines are configured as shield twisted pair units so as to attain properties of the six data line pairs. Furthermore, a combination of the utility line and the HPD line for the HEAC function are also configured as a shield twisted pair unit.

In the new HDMI cable, the number of copper lines to be connected is larger than that of the general HDMI cable (refer to FIG. 8A). In the new HDMI cable, drain lines included in shield twisted pair units which are connected to the dedicated pins of the plugs in the case of the general HDMI cable are connected to metal shells of the plugs. Therefore, the shield pins become available, increase of the number of unavailable pins in the plugs is avoided, and the plugs of the new HDMI cable becomes the same as the plugs of the general HDMI cable. By this, in the case where the drain lines included in the shield twisted pair units are connected to the metal shells of the plugs, shields of differential pair lines may be ensured since the shells of the receptacles to which the plugs are to be inserted are connected to ground levels.

Figure 10:
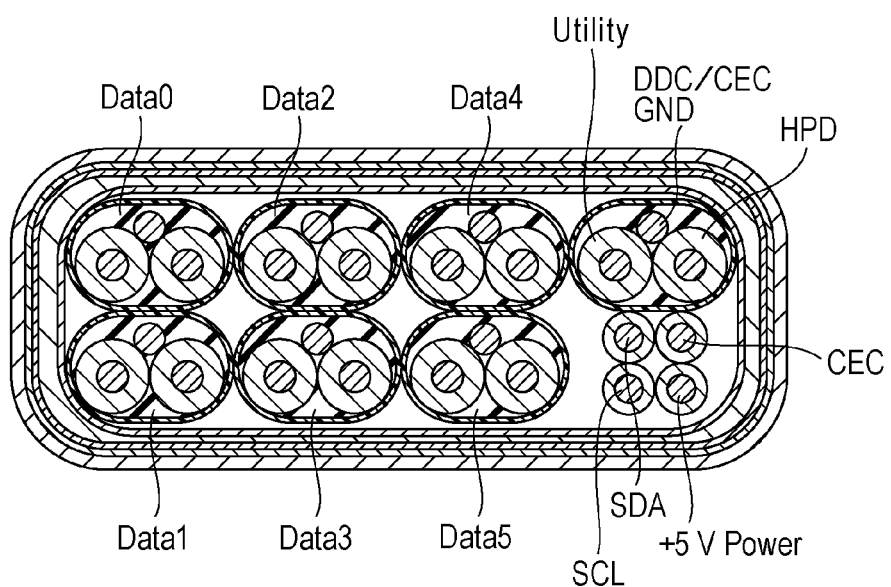
FIG. 10 is a diagram illustrating another configuration of the new HDMI cable.

FIG. 10 shows another configuration of the new HDMI cable used as the cable 200. The new HDMI cable has substantially the same configuration as the new HDMI cable shown in FIG. 9 except that a cross-sectional shape thereof is rectangle. Note that, since the rectangular cross-sectional shape is obtained, a small cross-sectional area may be obtained, and in addition, impedance consistency may be easily attained.

Control of Operation Modes of General HDMI and New HDMI

Next, control of operation modes of the controller 113 included in the source apparatus 110 will be described. As described above, when determining that the cable 200 and the sink apparatus 120 are compatible with the new HDMI, the controller 113 controls the data transmission unit 112 so that the data transmission unit 112 operates in an operation mode corresponding to the new HDMI. Furthermore, the controller 113 controls the data transmission unit 112 so that the data transmission unit 112 operates in an operation mode corresponding to the general HDMI in other cases.

Figure 11:
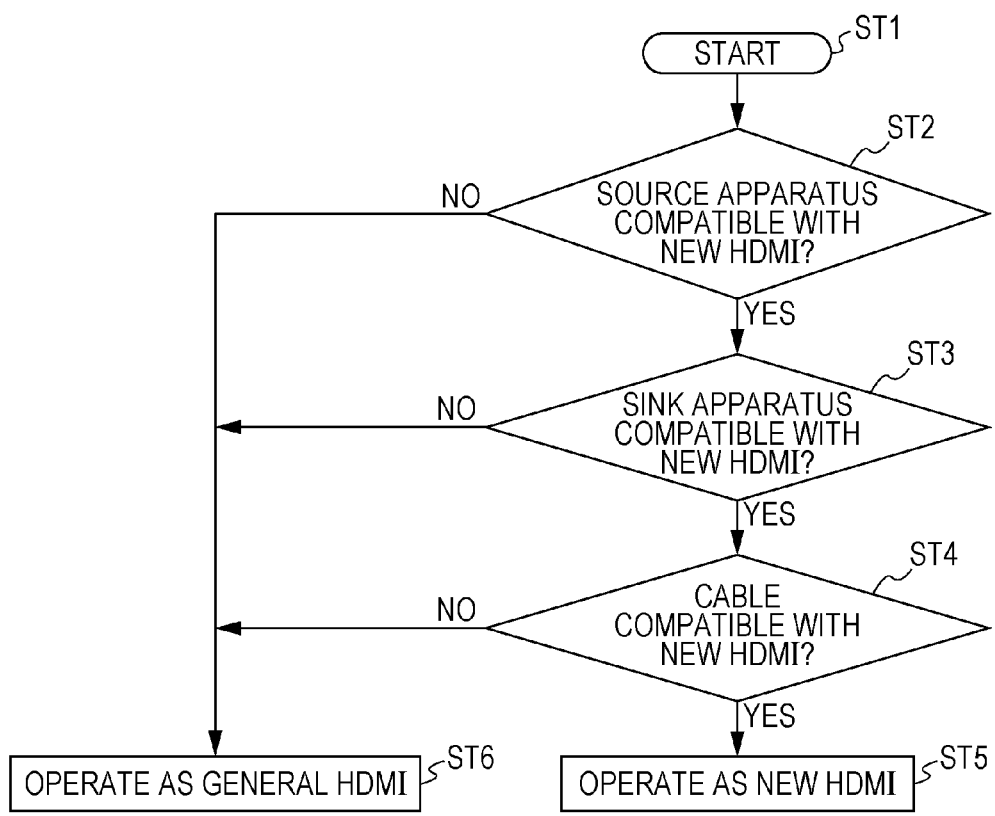
FIG. 11 is a flowchart illustrating a processing procedure of controlling an operation mode of a controller of the source apparatus.

FIG. 11 is a flowchart illustrating a processing procedure of control of the operation modes of the controller 113. The controller 113 starts a process in step ST1, and thereafter, the process proceeds to step ST2. In step ST2, the controller 113 determines whether the source apparatus 110, that is, whether the data transmission unit 112 is compatible with the new HDMI. Since the controller 113 has information on capability of the source apparatus 110 (data transmission unit 112) which includes the controller 113 in advance, the determination may be easily made. Note that, since it is apparent that the source apparatus 110 is compatible with the new HDMI in this embodiment, the controller 113 may omit the determination process of step ST2.

When it is determined that the source apparatus 110 is compatible with the new HDMI, the controller 113 determines whether the sink apparatus 120, that is, the data reception unit 122 is compatible with the new HDMI. This determination will be described in detail hereinafter. When it is determined that the sink apparatus 120 is compatible with the new HDMI, the controller 113 proceeds to a process in step ST4. In step ST4, the controller 113 determines whether the cable 200 is compatible with the new HDMI. This determination will be described in detail hereinafter.

When it is determined that cable 200 is compatible with the new HDMI, the controller 113 proceeds to a process in step ST5. In step ST5, the controller 113 controls the data transmission unit 112 so that the data transmission unit 112 operates in the operation mode corresponding to the new HDMI. On the other hand, when it is determined that the source apparatus 110, the sink apparatus 120, or the cable 200 is not compatible with the new HDMI in step ST2, step ST3, or step ST4, the controller 113 proceeds to a process in step ST6. In step ST6, the controller 113 controls the data transmission unit 112 so that the data transmission unit 112 operates in the operation mode corresponding to the general HDMI.

Note that, when it is determined that the sink apparatus 120 is compatible with the new HDMI in step ST3, for example, the controller 113 transmits a final result of the determination of the operation mode to the sink apparatus 120 through the cable 200. The determination result is transmitted as information on control of info-flame before data transmission from the source apparatus 110. In the sink apparatus 120, in accordance with the result of the determination of the operation mode supplied from the source apparatus 110, the controller 123 controls the data reception unit 122 so that the data reception unit 122 operates in an operation mode the same as that of the data transmission unit 112 included in the source apparatus 110.

Figure 12A:
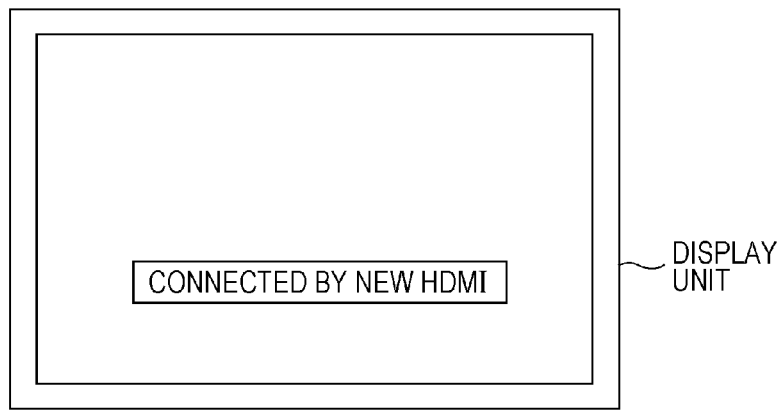
FIGS. 12A to 12C are diagrams illustrating UI screens displayed in a display unit under control of the controller included in the source apparatus.

Furthermore, when controlling the data transmission unit 112 so that the data transmission unit 112 operates in the operation mode corresponding to the new HDMI in step ST5, the controller 113 may perform control so that an UI screen representing that the data transmission unit 112 operates in the operation mode corresponding to the new HDMI is displayed in a display unit as shown in FIG. 12A, for example. Through this UI screen, a fact that the source apparatus 110 and the sink apparatus 120 are connected to each other in the new HDMI may be easily recognized. Note that the display unit, not shown, which displays the UI screen is included in the source apparatus 110 or included in the sink apparatus 120. This is true for UI display described hereinafter.

Figure 12B:
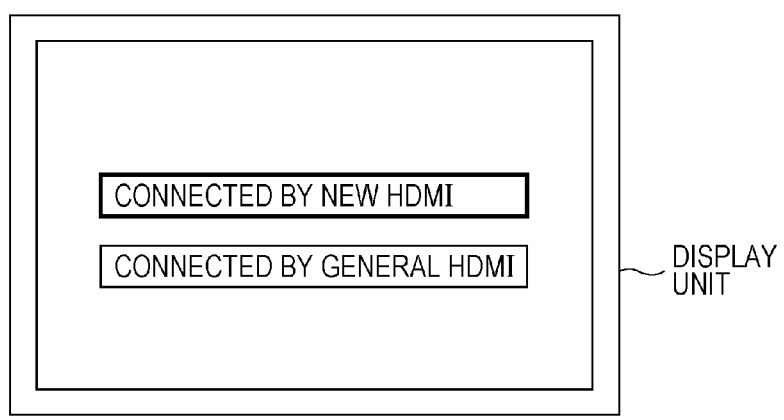
Figure 12C:
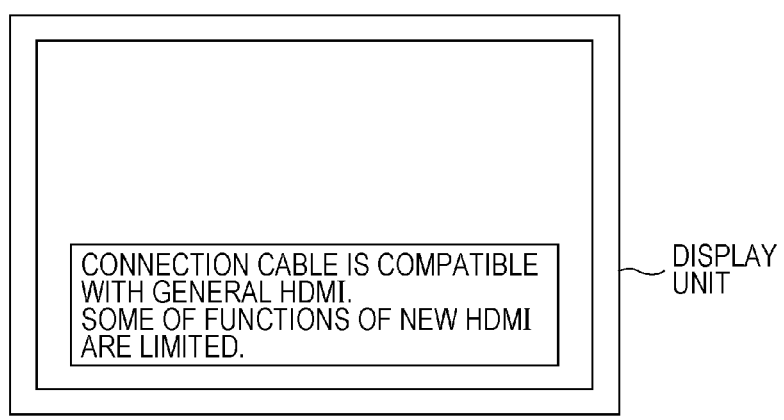

Furthermore, when determining that the cable 200 is not compatible with the new HDMI in step ST4, and therefore, proceeding to the process in step ST6, the controller 113 may perform control so that the UI screen representing that the cable 200 is not compatible with the new HDMI is displayed in the display unit as shown in FIG. 12C, for example. Through this UI screen, a user may easily recognize a fact that the source apparatus 110 and the sink apparatus 120 are compatible with the new HDMI but the cable 200 is not compatible with the new HDMI, and the user may take measures including replacement of the cable 200 by a new HDMI cable, for example.

Furthermore, in the processing procedure in the flowchart shown in FIG. 11, when it is determined that the cable 200 is compatible with the new HDMI in step ST4, the controller 113 immediately proceeds to step ST5 and performs the control so that the data transmission unit 112 operates in the operation mode corresponding to the new HDMI. However, when it is determined that the cable 200 is compatible with the new HDMI in step ST4, the controller 113 may allow the user to select the new HDMI or the general HDMI.

In this case, the controller 113 performs control so that a UI screen is displayed in the display unit as shown in FIG. 12B, for example. The user selects the new HDMI or the general HDMI in accordance with this UI screen. FIG. 12B shows a state in which the "new HDMI" is selected. The controller 113 performs control in accordance with the user's selection so that the data transmission unit 112 operates in an operation mode corresponding to the new HDMI or the general HDMI.

Figure 13:
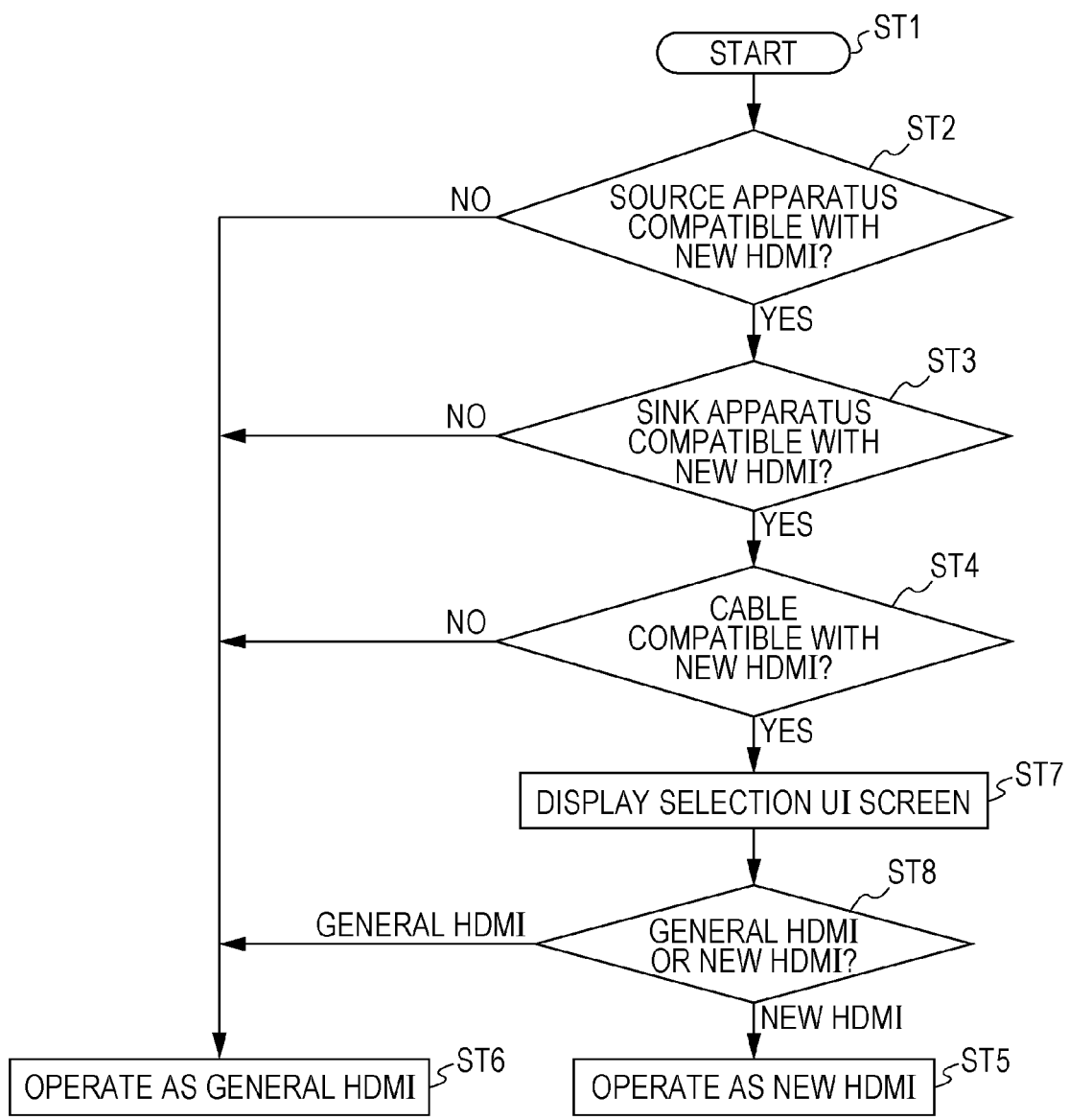
FIG. 13 is a flowchart illustrating another processing procedure of controlling an operation mode of the controller of the source apparatus.

FIG. 13 is a flowchart illustrating a processing procedure of control of an operation mode of the controller 113 in this case. In FIG. 13, reference numerals the same as those shown in FIG. 11 are assigned to portions the same as those of FIG. 11, and descriptions thereof are omitted. When determining that the cable 200 is compatible with the new HDMI in step ST4, the controller 113 proceeds to a process in step ST7. In step ST7, the controller 113 performs control so that the UI screen used to select the new HDMI or the general HDMI is displayed in the display unit. The display of the UI screen may be instructed by transmitting a video signal from the source apparatus 110 through the cable 200 or may be instructed by the sink apparatus 120 itself.

Thereafter, the controller 113 proceeds to a process in step ST8. In step ST8, the controller 123 transmits information on a user's operation performed by a remote controller through a line such as the CEC line whereby the controller 113 determines whether the user selected the new HDMI or the general HDMI. When the user selects the new HDMI, the controller 113 performs control so that the data transmission unit 112 operates in the operation mode corresponding to the new HDMI in step ST5. On the other hand, when the user selects the general HDMI, the controller 113 performs control so that the data transmission unit 112 operates in the operation mode corresponding to the general HDMI in step ST6.

Determination as to Whether Sink Apparatus Corresponds to New HDMI

A method for determining whether the sink apparatus 120 is compatible with the new HDMI which is performed by the controller 113 will be described. The determination method includes first and second determination methods.

First Determination Method

The controller 113 determines whether the sink apparatus 120 is compatible with the new HDMI in accordance with an EDID read from the sink apparatus 120 using the DDC line (the SDA line and the SCL line) included in the cable 200. The EDID has a data configuration specified by a certain format. It is assumed that information on a flag representing whether the sink apparatus 120 is compatible with the new HDMI (new transmission) is additionally defined in a certain portion of the EDID.

FIG. 14 is a diagram illustrating the flag information additionally defined in the EDID. The EDID generally has a data configuration representing various capability of the sink apparatus 120. In FIG. 14, only a byte associated with the present disclosure is shown and minimally simplified for simplicity of description. In the second bit, flag information "New Rx Sink" of one bit representing whether the sink apparatus 120 is compatible with the new HDMI is described. Furthermore, in the first bit, flag information "New Cable" of one bit representing whether the cable 200 is compatible with the new HDMI is additionally defined.

The controller 113 determines that the sink apparatus 120 is compatible with the new HDMI when the flag information "New Rx Sink" of one bit is included in the EDID read from the sink apparatus 120. Specifically, when the sink apparatus 120 is only compatible with the general HDMI, the flag information "New Rx Sink" of one bit described above is not included in the EDID read from the sink apparatus 120.

Second Determination Method

The controller 113 determines whether the sink apparatus 120 is compatible with the new HDMI by performing communication with the sink apparatus 120 through the cable 200. For example, the controller 113 determines whether the sink apparatus 120 is compatible with the new HDMI on a command basis using the CEC line.

Furthermore, the controller 113 determines, for example, whether the sink apparatus 120 is compatible with the new HDMI by performing communication with the sink apparatus 120 using the bidirectional communication path (HEAC function) including the utility line and the HPD line. Furthermore, the controller 113 determines, for example, whether the sink apparatus 120 is compatible with the new HDMI by performing transmission/reception of a signal using an unused line, e.g., the utility line until transmission becomes available.

Determination as to Whether Cable is Compatible with New HDMI

A method for determining whether the cable 200 is compatible with the new HDMI which is performed by the controller 113 will now be described. The determination method includes first to fourth determination methods below. The first to third determination methods are performed using an information provision function included in the cable 200 when the cable 200 is the new HDMI cable.

First Determination Method

Figure 15:
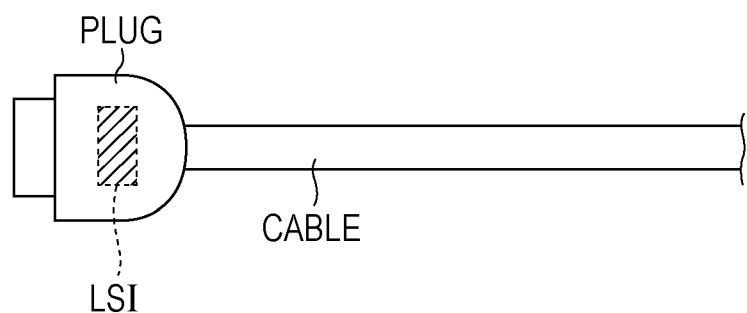
FIG. 15 is a diagram illustrating a method for determining whether a cable included in the controller is compatible with the new HDMI and illustrating a plug of the new HDMI cable which incorporates an LSI.

In the first determination method, as shown in FIG. 15, the new HDMI cable incorporates an LSI (Large Scale Integration) in a plug thereof, for example. For example, in a state in which the source apparatus 110 supplies a voltage of +5 V, the sink apparatus 120 requests the LSI to perform output in accordance with a CEC protocol while the HPD is in a low state. Note that, in this case, the sink apparatus 120 is compatible with the new HDMI. The LSI notifies the sink apparatus 120 of registered values (information representing that the cable 200 is compatible with the new HDMI and cable property data such as a transmission-allowable data band) implemented in the LSI in accordance with the CEC protocol in response to the output request issued by the sink apparatus 120.

The sink apparatus 120 additionally writes the information supplied from the LSI in the EDID of the sink apparatus 120 itself. After the additional write, the sink apparatus 120 brings the HPD to a high state and instructs the source apparatus 110 to read the EDID. The controller 113 determines whether the cable 200 is compatible with the new HDMI in accordance with the EDID read from the sink apparatus 120. Specifically, the controller 113 determines that the cable 200 is compatible with the new HDMI when the EDID includes the information representing that the cable 200 is compatible with the new HDMI, for example.

Note that, in the foregoing description, the sink apparatus 120 requests the LSI to perform output in accordance with the CEC protocol. However, the source apparatus 110 itself may request the LSI to perform output in accordance with the CEC protocol and may directly receive information on the registered values (the information representing that the cable 200 is compatible with the new HDMI and the cable property data such as the transmission-allowable data band) from the LSI.

Second Determination Method

Also in the second determination method, the new HDMI cable includes an LSI in the plug thereof. The source apparatus 110 reads and obtains the EDID representing the capability of the sink apparatus 120 from the sink apparatus 120 at a timing when the HPD is changed from the low state to the high state. In this case, the EDID is transmitted to the source side by transmitting data written in the EEPROM of the sink apparatus 120 in series using the SDA/SCL line.

The LSI observes a line which transmits information on the EDID, that is, the LSI observes signals of the SDA/SCL line during transmission of the EDID. Then, when the flag information (the first bit of the certain byte shown in FIG. 14) representing whether the cable 200 is compatible with the new HDMI is transmitted, the LSI changes a value of the bit to a value corresponding to a state in which the cable 200 is compatible with the new HDMI, that is, a state in which the flag is on. Specifically, although data included in EDIDROM (EEPROM) of the sink apparatus 120 is "00000100", the data is changed to "00000110" when the source apparatus 110 receives the data since the LSI included in the cable 200 rewrites the data in transmission.

The controller 113 determines whether the cable 200 is compatible with the new HDMI in accordance with the EDID read from the sink apparatus 120. Specifically, the controller 113 determines that the cable 200 is compatible with the new HDMI when the flag information representing whether the cable 200 is compatible with the new HDMI (the first bit of the certain byte shown in FIG. 14) represents that the cable 200 is compatible with the new HDMI.

Figure 16:
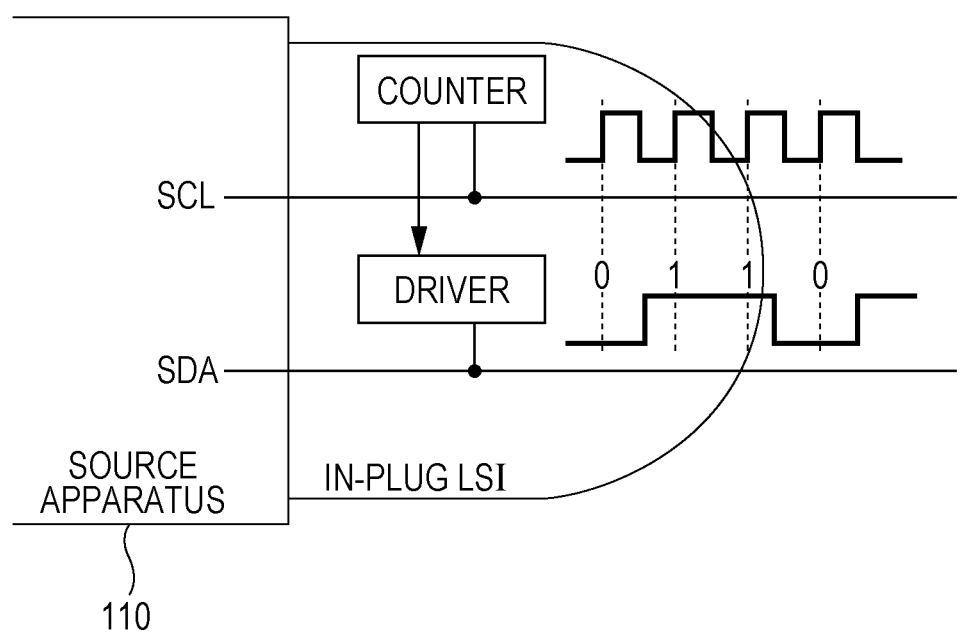
FIG. 16 is a diagram illustrating a method for determining whether the cable included in the controller is compatible with the new HDMI and illustrating an EDID data rewriting circuit included in an LSI included in the new HDMI cable.

FIG. 16 shows an example of an EDID data rewrite circuit of the LSI included in the cable 200. The LSI includes a counter which counts a clock in the SCL line and a driver which rewrites data in the SDA line in accordance with a count value of the counter.

Third Determination Method

Figure 17:
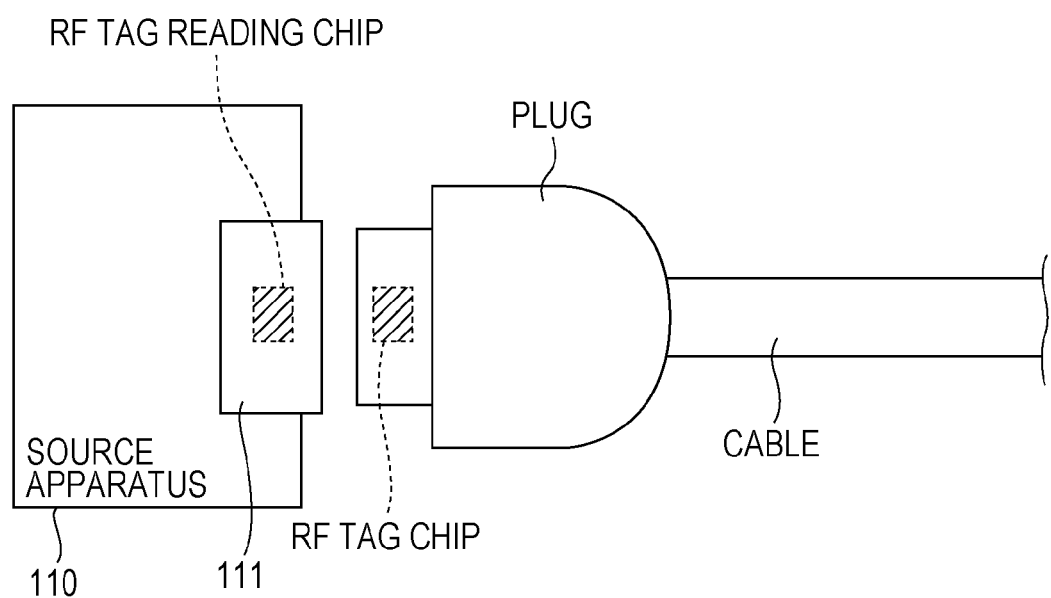
FIG. 17 is a diagram illustrating a method for determining whether the cable included in the controller is compatible with the new HDMI and illustrating a plug of the new HDMI cable which incorporates an RF tag chip (LSI)

In a case of the third determination method, a new HDMI cable incorporates an RF tag chip (LSI) which stores information representing that the cable 200 is compatible with the new HDMI and information on a transmission-allowable data band as shown in FIG. 17. Furthermore, the receptacle 111 included in the source apparatus 110 incorporates an RF tag reading chip (LSI). In this case, near field wireless communication is performed between the RF tag reading chip of the receptacle 111 and the RF tag chip of a plug so that information stored in the RF tag chip is read by the RF tag reading chip.

The controller 113 determines whether the cable 200 is compatible with the new HDMI in accordance with the information read by the RF tag reading chip. Specifically, the controller 113 determines that the cable 200 is compatible with the new HDMI when information representing that the cable 200 is compatible with the new HDMI, for example, is read by the RF tag reading chip.

Note that the near field wireless communication is performed between the RF tag reading chip of the receptacle 111 of the source apparatus 110 and the RF tag chip of the plug so that the information stored in the RF tag chip is read by the source apparatus 110 as described hereinabove. However, for example, the near field wireless communication may be performed between an RF tag reading chip of the receptacle 121 of the sink apparatus 120 and the RF tag chip of the plug. In this case, the information stored in the RF tag chip is read by the sink apparatus 120, and thereafter, the information is supplied to the source apparatus 110.

Fourth Determination Method

Figure 18:
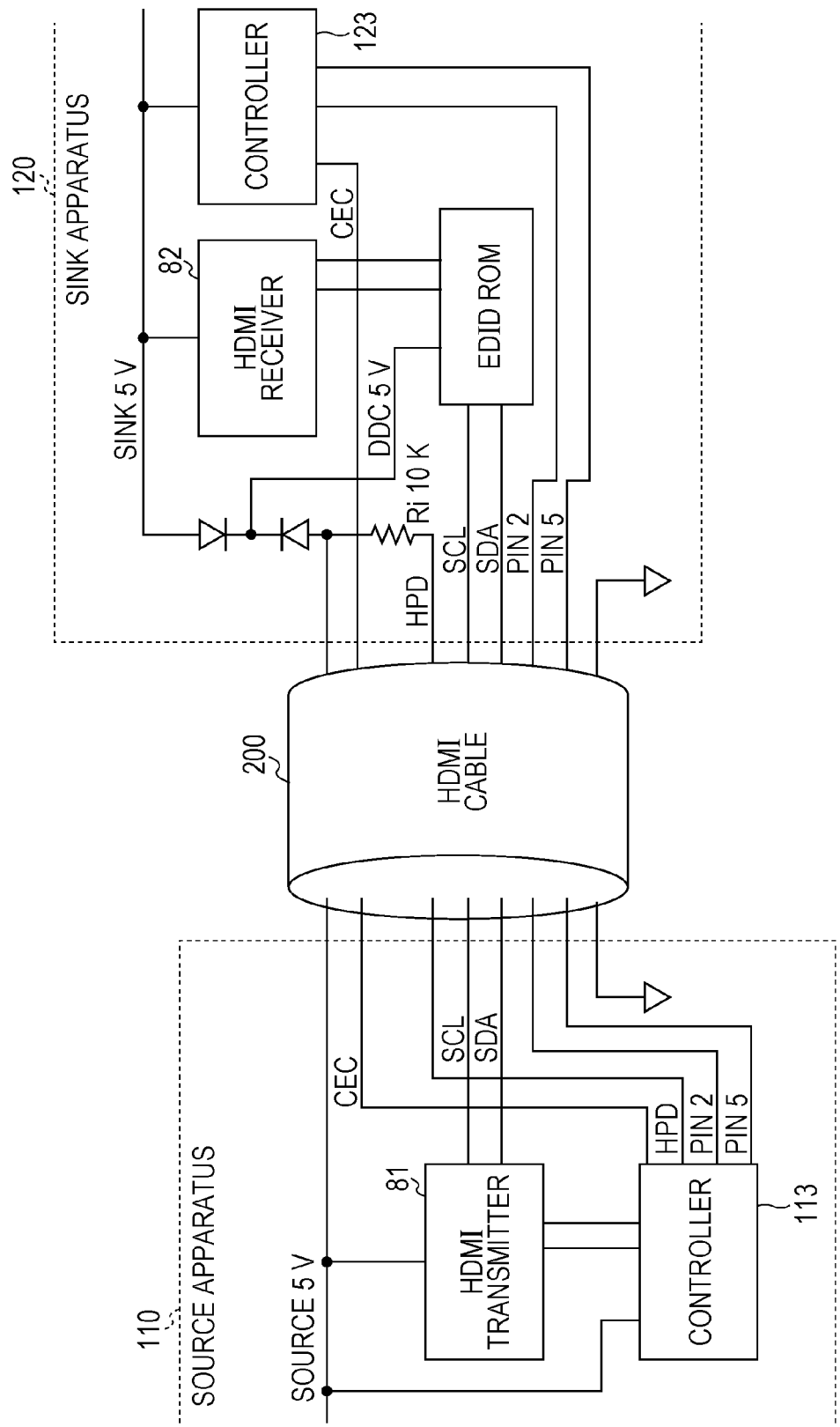
FIG. 18 is a diagram illustrating a method for determining whether the cable included in the controller is compatible with the new HDMI by measuring an electric characteristic of the cable.

In a fourth determination method, the controller 113 determines whether the source cable 200 is compatible with the new HDMI by measuring electrical characteristics of the cable 200. As shown in FIG. 18, the controller 113 of the source apparatus 110 outputs a test signal (digital signal) for measurement/detection to the pins 2 and 5. The controller 123 of the sink apparatus 120 receives the signal. Note that, although a pair of signal lines connected to the pins 2 and 5 does not serve as a transmission path for a differential signal in the general HDMI, the pair of signal lines connected to the pins 2 and 5 serves a transmission path for a differential signal in the new HDMI cable (refer to FIGS. 6A and 6B).

The controller 123 of the sink apparatus 120 transmits the received digital signal to the source apparatus 110 through another path (the DDC line of the HDMI represented by SCL and SDA, the CEC line, or the utility line). The controller 113 of the source apparatus 110 determines whether the cable 200 is compatible with the new HDMI by determining whether the digital signal transmitted from the sink apparatus 120 coincides with the digital data transmitted by the controller 113 itself. Specifically, when the received digital signal coincides with the transmitted digital signal, the controller 113 determines that the cable 200 is compatible with the new HDMI.

Figure 19A:
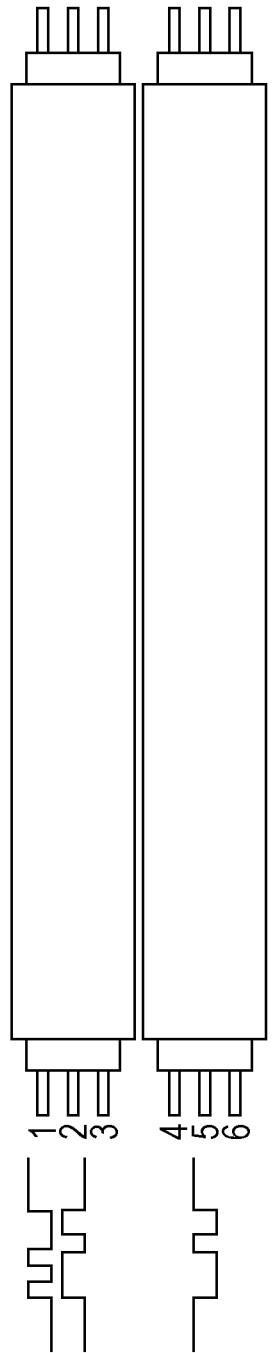
FIGS. 19A and 19B are diagrams illustrating a determination as to whether the cable is compatible with the new HDMI by measuring an electric characteristic of the cable.

As shown in FIG. 19A, when the cable 200 is the general HDMI cable, the pair of signal lines connected to the pins 2 and 5 is not a shield twisted pair line. Therefore, a determination as to whether the cable 200 is compatible with the general HDMI is made with reference to a fact that "the test signal is not allowed to be transmitted at high speed". In this case, interference caused by applying a signal which is not associated with the pin 2 to the pin 1 or the pin 3 which is associated with the pin 2 may be utilized to make the determination. Due to this interference, it becomes more difficult to transmit a test signal at high speed.

Figure 19B:
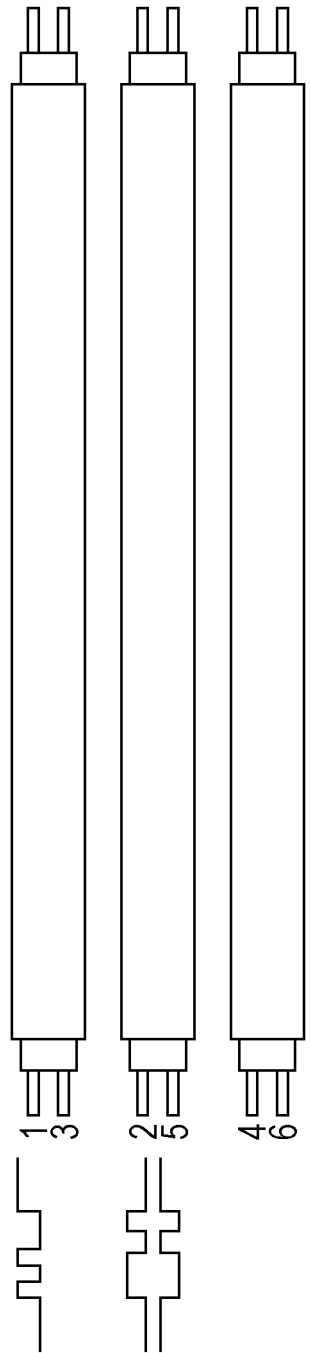

On the other hand, as shown in FIG. 19B, when the cable 200 is the new HDMI cable, the pair of signal lines connected to the pins 2 and 5 is a shield twisted pair line. Therefore, the determination as to whether the cable 200 is compatible with the new HDMI cable is made with reference to a fact that "the test signal is allowed to be transmitted at high speed". In this case, even when a signal which is not associated with the pin 2 is supplied to the pin 1 or the pin 3, since a shield process is independently performed on the pins 1 and 3, the supplied signal and the pin 2 do not interfere with each other. Accordingly, the transmission of the test signal is not affected.

Here, the test signal is highest-speed data which may be output from the source apparatus 110 and random data having a length which is long enough to evaluate 10-9 which is ensured by the HDMI as a bit error rate. Note that, since the sink apparatus 120 incorporates a frame buffer memory generally used to reproduce video images, a memory for dedicated use of the transmission test may not be used.

Note that, in the foregoing description, the controller 113 determines that the cable 200 is compatible with the new HDMI only when the received digital signal coincides with the transmitted digital signal. The controller 113 performs a similar test at a low data transmission speed and repeatedly performs the determination process until the received digital signal coincides with the transmitted digital signal whereby capability of the cable 200 is confirmed and it is determined that the cable 200 is compatible with the new HDMI. However, transmission may be performed as much as executable within the transmission speed. In this case, it is possible that the general HDMI cable is determined to be compatible with the new HDMI.

Furthermore, in the foregoing embodiment, the pins 2 and 5 are used. However, instead of these pins, the pins 8 and 11 which have the relationship the same as that of the pins 2 and 5 may be used in the general HDMI cable and the new HDMI cable. Specifically, although a pair of signal lines connected to the pins 8 and 11 does not serve as a transmission path for a differential signal in the general HDMI, the pair of signal lines connected to the pins 8 and 11 serves as a transmission path for a differential signal in the new HDMI cable (refer to FIGS. 6A and 6B).

Furthermore, in the foregoing description, the sink apparatus 120 transmits the digital signal (test signal) supplied from the source apparatus 110 to the source apparatus 110 and the source apparatus 110 determines whether the received signal coincides with the transmitted signal. However, the sink apparatus 120 may transmit a predetermined pattern as a digital signal (test signal) and determine whether a received digital signal is valid. Then, only a result of the determination may be transmitted to the source apparatus 110 through the CEC line or the like or information on the result may be additionally written to the E-EDID of the sink apparatus 120.

As described above, in the AV system 100 shown in FIG. 1, the data transmission unit 112 of the source apparatus 110 has the operation mode corresponding to the new HDMI mode in addition to the operation mode corresponding to the general HDMI. Here, the three differential signal channels are used to transmit a digital signal such as video data in the general HDMI whereas the six differential signal channels are used in the HDMI. Therefore, when the new HDMI is used, signal transmission may be performed in a high data rate. Furthermore, since the general HDMI is used when the sink apparatus 120 and the cable 200 are not compatible with the new HDMI, backward compatibility is ensured.

Another Configuration of New HDMI

As described above, the DDC line is used when the data transmission unit 112 reads the E-EDID from the data reception unit 122 or when information is transmitted and received for the device authentication and the key exchange in the HDCP system for copyright protection. The information exchange is performed when the source apparatus 110 and the sink apparatus 120 are connected to each other. The DDC line is not used after the connection is completed except for when an HDCP key is periodically updated.

Furthermore, as described above, the HEC (HDMI Ethernet Channel) is newly defined in the HDMI1.4 and enables transmission/reception of information through the Ethernet between HDMI devices. However, it is difficult to expand a band to 100 Mbps in a current technique or more due to superposing on an HPD signal and a configuration of complete bidirectional communication through two lines using an echo canceller. Taking the situation above into consideration, the configuration in which the EDID is read through the DDC line at a time of connection and high-speed data communication is available using the two signal lines included in the DDC line is obtained.

Other Configurations of Data Transmission Unit and Data Reception Unit

FIGS. 20 and 21 are diagrams illustrating other configurations of the data transmission unit 112 included in the source apparatus 110 and the data reception unit 122 included in the sink apparatus 120 which are included in the AV system 100 shown in FIG. 1. FIG. 20 shows other configurations of the data transmission unit 112 included in the source apparatus 110 and the data reception unit 122 included in the sink apparatus 120 in a three-channel mode which correspond to the configurations shown in FIG. 3 described above. FIG. 21 shows other configurations of the data transmission unit 112 included in the source apparatus 110 and the data reception unit 122 included in the sink apparatus 120 in a six-channel mode which correspond to the configurations shown in FIG. 4 described above.

In each of these configurations, the two lines included in the DDC line, that is, the SDA line and the SCL line are used as I2C communication lines and high-speed data communication lines. When the two signal lines are used as the I2C communication lines, I2C bidirectional communication is performed. On the other hand, when the two signal lines are also used as the high-speed data communication lines, bidirectional differential communication is performed.

Therefore, in each of the data transmission unit 112 and the data reception unit 122, one of the I2C communication unit and a differential high-speed driver/receiver is selectively connected to the two signal lines. Here, the I2C communication unit serves as a first communication unit and the differential high-speed driver/receiver serves as a second communication unit. Note that, although not described in detail, other configurations in FIGS. 20 and 21 are the same as those in FIGS. 3 and 4.

FIG. 22A shows pin assignment of the receptacles in the three-channel mode and FIG. 22B shows pin assignment of the receptacles in the six-channel mode. A pin 16 is assigned to an "SDA signal" and a "differential signal+". Furthermore, a pin 15 is assigned to an "SCL signal" and a "differential signal−". Note that, although not described in detail, other configurations in FIGS. 22A and 22B are the same as those in FIGS. 6A and 6B.

Figure 23:
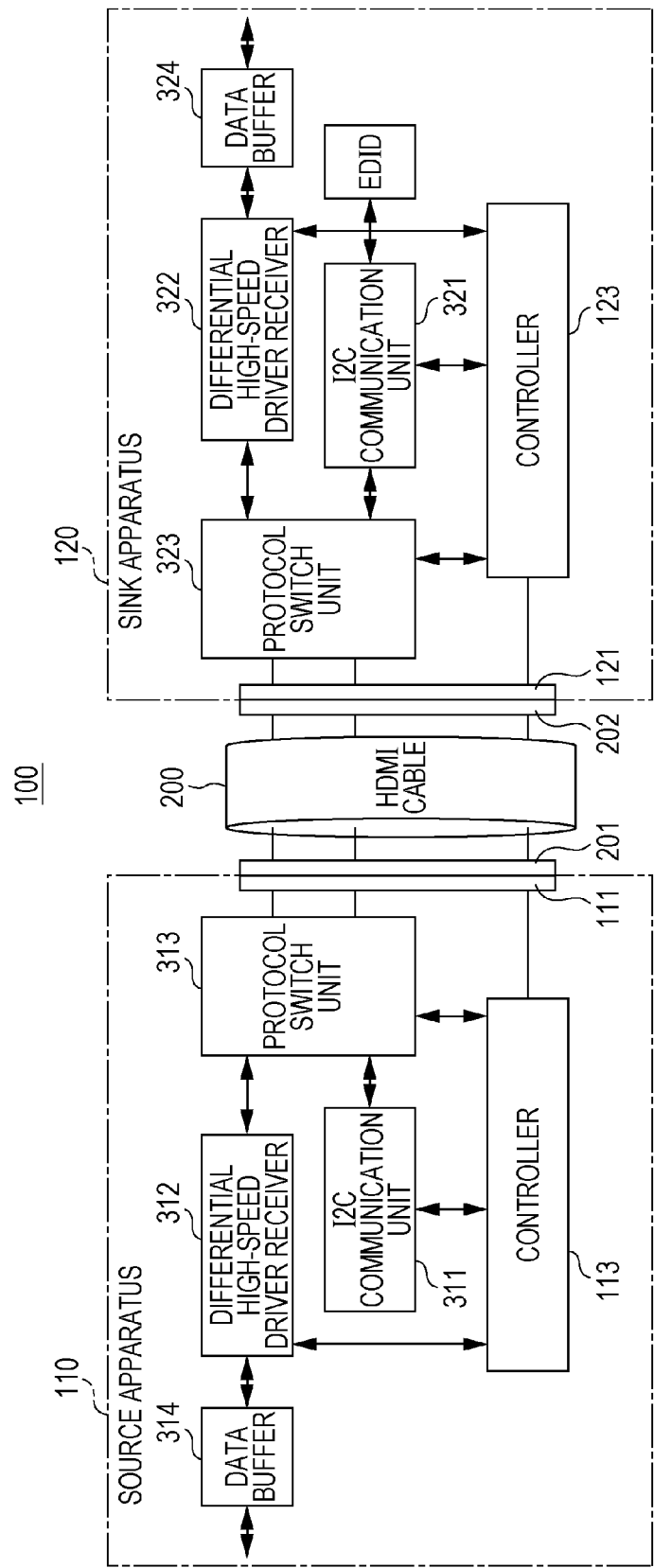
FIG. 23 is a block diagram illustrating configurations of portions of the source apparatus and the sink apparatus which are associated with a DDC line (including an SDA line and an SCL line) in detail.

FIG. 23 shows detailed configurations of portions of the source apparatus 110 and the sink apparatus 120 which are associated with the DDC line (the SDA line and the SCL line). The source apparatus 110 includes an I2C communication unit 311, a differential high-speed driver/receiver 312, a protocol switch unit 313, and a data buffer 314. Similarly, the source apparatus 120 includes an I2C communication unit 321, a differential high-speed driver/receiver 322, a protocol switch unit 323, and a data buffer 324.

Each of the I2C communication units 311 and 321 performs the I2C bidirectional communication using the two signal lines as the I2C communication lines. Each of the differential high-speed driver/receivers 312 and 322 performs the bidirectional differential communication using the two signal lines as the high-speed data communication lines. The protocol switch units 313 and 323 selectively connect the I2C communication units 311 and 321 or the differential high-speed driver/receivers 312 and 322 to the two signal lines under control of the controllers 113 and 123, respectively. The data buffers 314 and 324 buffer data transmitted and received by the differential high-speed driver/receivers 312 and 322, respectively.

Figure 24:
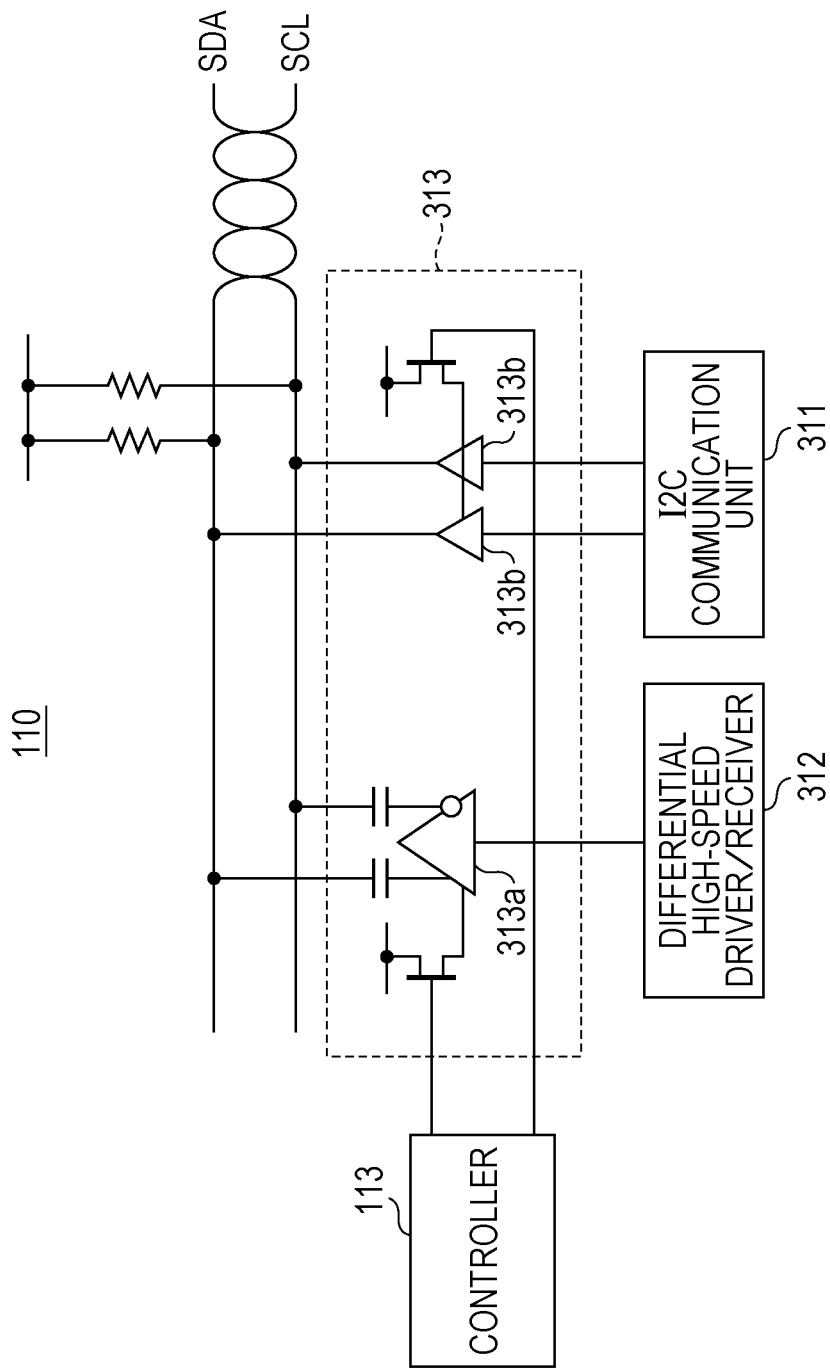
FIG. 24 is a diagram illustrating a configuration of a protocol switch unit included in the source apparatus (only transmission)

FIG. 24 shows a configuration of the protocol switch unit 313 included in the source apparatus 110 (only transmission). Note that the SDA line and the SCL line are connected to (pulled up) the power source through respective resistors R. The protocol switch unit 313 includes a transistor 313a used to connect the differential high-speed driver/receiver 312 to the two signal lines and transistors 313b used to connect the I2C communication unit 311 to the two signal lines. A low-voltage high-speed operation transistor is used as the transistor 313a whereas pressure-resisting transistors of 5 V which operate in accordance with an HDMIDDC standard is used as the transistors 313b.

Here, to ensure an operation speed of the transistor 313a which is the low-voltage high-speed operation transistor, a parasitic capacitance and a serial resistance component in a signal output line should be reduced. This may be realized by turning off the transistor 313a in the I2C bidirectional communication mode and by turning off the transistors 313b in the bidirectional differential communication mode using a mode switching signal supplied from the controller 113, for example.

Specifically, in the operation of the I2C bidirectional communication, the transistors 313b are turned on so that the I2C communication unit 311 is connected to the two signal lines and the transistor 313a is turned off so that the differential high-speed driver/receiver 312 is disconnected from the two signal lines. On the other hand, in the operation of the bidirectional differential communication, the transistor 313a is turned on so that the differential high-speed driver/receiver 312 is connected to the two signal lines and the transistors 313b are turned off so that the I2C communication unit 311 is disconnected from the two signal lines.

Change of Communication Mode Using DDC Line

Figure 25:
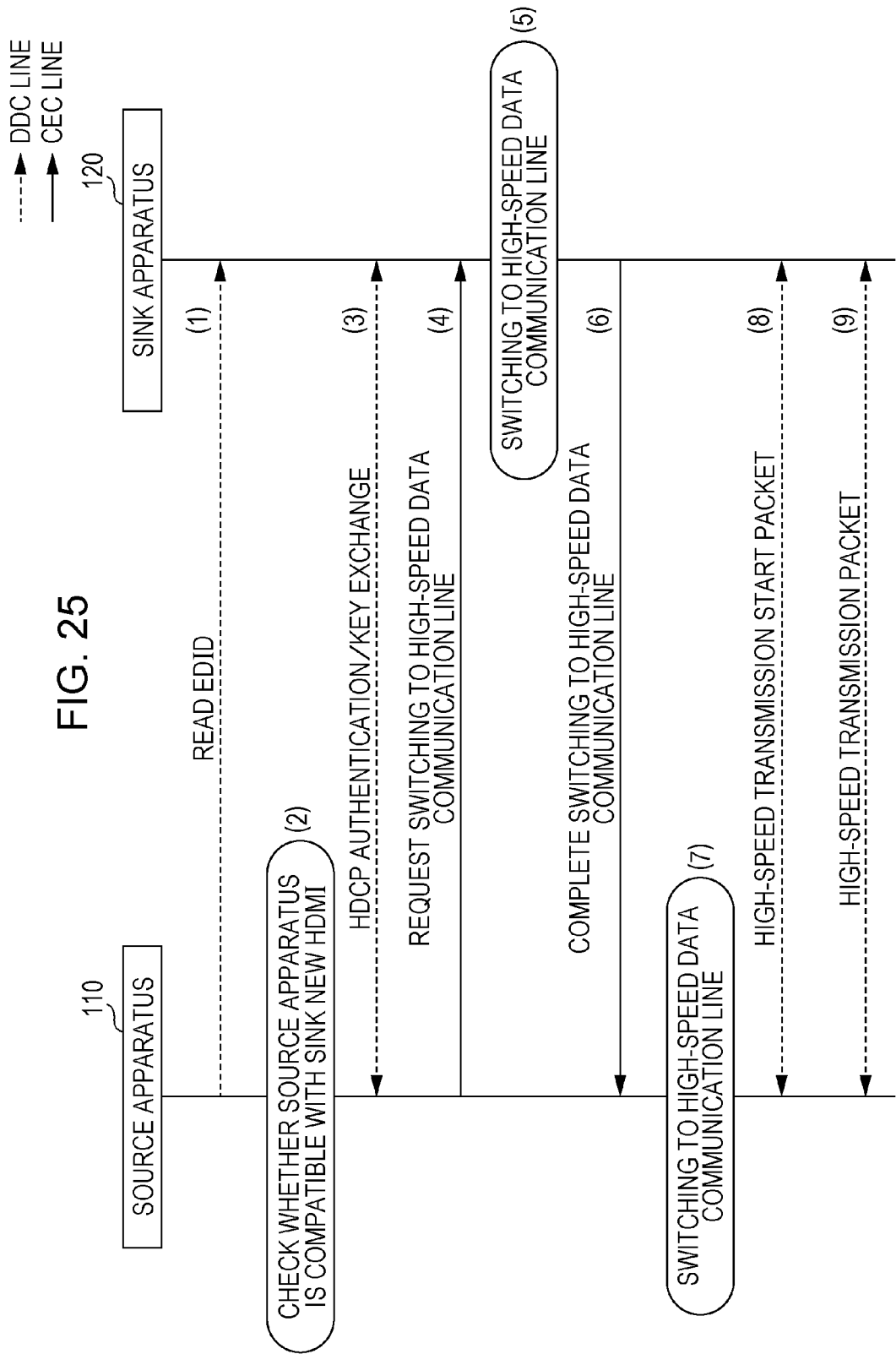
FIG. 25 is a diagram illustrating a sequence of a process of changing the DDC line (I2C communication line) to a high-speed data communication line.

FIG. 25 shows a sequence of a process of changing the DDC line (serves as the I2C communication line) to the high-speed data communication line. At a time of connection, when the sink apparatus 120 brings an HPD signal to a high state, the source apparatus 110 reads the EDID from the sink apparatus 120 through the DDC line (sequence (1)).

The source apparatus 110 compares information on availability of switching to the high-speed data communication line included in the read EDID of the sink apparatus 120 with the capability of the sink apparatus 120. When the information on availability matches the capability of the sink apparatus 120, the source apparatus 110 recognizes that switching may be performed (sequence (2)). Thereafter, a flow of the HDCP authentication and the key exchange is performed and the communication using the DDC line performed in a normal connection is completed (sequence (3)). Note that a certain amount of data is transmitted in bidirectional transmission for the HDCP authentication and the key exchange, and therefore, the HDCP authentication and the key exchange may be performed after switching to the high-speed data communication line is performed so that a high-speed process is attained. Furthermore, the source apparatus 110 may determine whether the sink apparatus 120 is allowed to be switched to the high-speed data communication line, that is, whether the sink apparatus 120 supports the bidirectional differential communication by performing communication using the CEC line with the sink apparatus 120.

Thereafter, when the cable 200 supports the bidirectional differential communication, the source apparatus 110 requests the sink apparatus 120 to perform switching to the high-speed data communication line through a line other than the DDC line, e.g., the CEC line (sequence (4)). Note that a method for determining whether the cable 200 supports the bidirectional differential communication will be described hereinafter.

In response to the request, the sink apparatus 120 switches the DDC line of itself to the high-speed data communication line (sequence (5)). Specifically, the controller 123 controls the protocol switch unit 323 so that the differential high-speed driver/receiver 322 is connected to the two signal lines included in the DDC line. Thereafter, the sink apparatus 120 notifies the source apparatus 110 of information representing that the switching to the high-speed data communication line is completed through the CEC line (sequence (6)).

When recognizing that the sink apparatus 120 switches the DDC line to the high-speed communication line, the source apparatus 110 switches the DDC line of the source apparatus 110 to the high-speed data communication line (sequence (7)). Specifically, the controller 113 controls the protocol switch unit 313 so that the differential high-speed driver/receiver 312 is connected to the two signal lines included in the DDC line.

When both of the source apparatus 110 and the sink apparatus 120 perform the switching to the high-speed data communication line, first, a high-speed transmission-start packet may be transmitted and received between the source apparatus 110 and the sink apparatus 120 for confirmation so that change of the configurations is confirmed (sequence (8)).

By this, it is confirmed that the DDC lines (serving as the I2C communication lines) of the source apparatus 110 and the sink apparatus 120 are changed to the high-speed data communication lines, and accordingly, bidirectional differential communication using the high-seed data communication lines, that is, high-speed bidirectional data transmission may be performed (sequence (9)).

Note that, although update of an HDCP encryption key which is generally performed using the DDC line, data may be transmitted and received between the source apparatus 110 and the sink apparatus 120 by packing the data as a data packet, for example, after the switching to the high-speed data communication line is performed as described above. Furthermore, the bidirectional differential communication using the two signal lines included in the DDC line described above is performed independently from a general data transmission method such as the CEC and the HEC, and therefore, the bidirectional differential communication and the data transmission method may be simultaneously performed.

Bidirectional Differential Communication Using High-Speed Data Communication Line Next, the bidirectional differential communication performed using the high-speed data communication line will be described. Bidirectional transmission using two differential lines may be realized by an echo canceller similarly to the HEC for complete bidirectional communication or may be realized by time-sharing communication.

Figure 26:
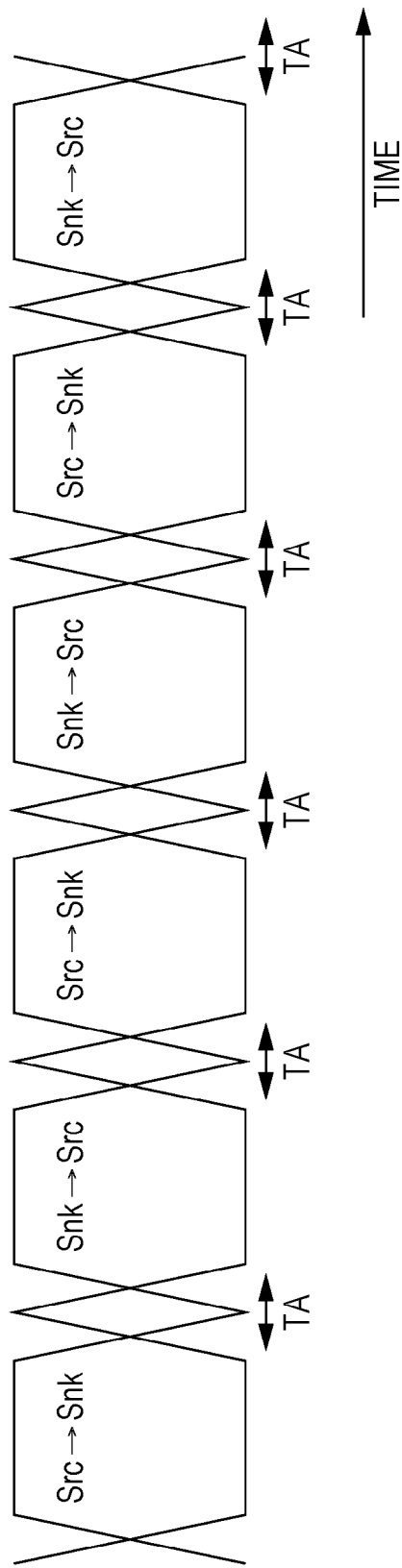
FIG. 26 is a diagram schematically illustrating a time-sharing bidirectional communication in bidirectional differential communication using the high-speed data communication line.

FIG. 26 is a diagram schematically illustrating time-sharing bidirectional communication. In FIG. 26, first, transmission of 512 bytes (the minimum frame size and the minimum slot time of the Gigabit Ethernet) is performed by a source apparatus (Src) to a sink apparatus (Snk). Subsequently, after a communication-direction turn-around time TA is elapsed, the sink apparatus (Snk) performs transmission of 512 bytes to the source apparatus (Src). Thereafter, the time-sharing bidirectional communication is similarly performed by alternating a communication direction. Although an entire transmission speed should be more than double of an one-way transmission, the time-sharing bidirectional communication may be realized cheaper than the bidirectional configuration using the echo canceller.

Note that, in the time-sharing bidirectional communication, as shown in FIG. 26, the communication direction may be alternated every certain amount of data or an amount of data to be transmitted may be reserved in advance and change of the direction may be banned while the transmission of the data so that efficient transmission is achieved.

Configuration of Cable

Figure 27:
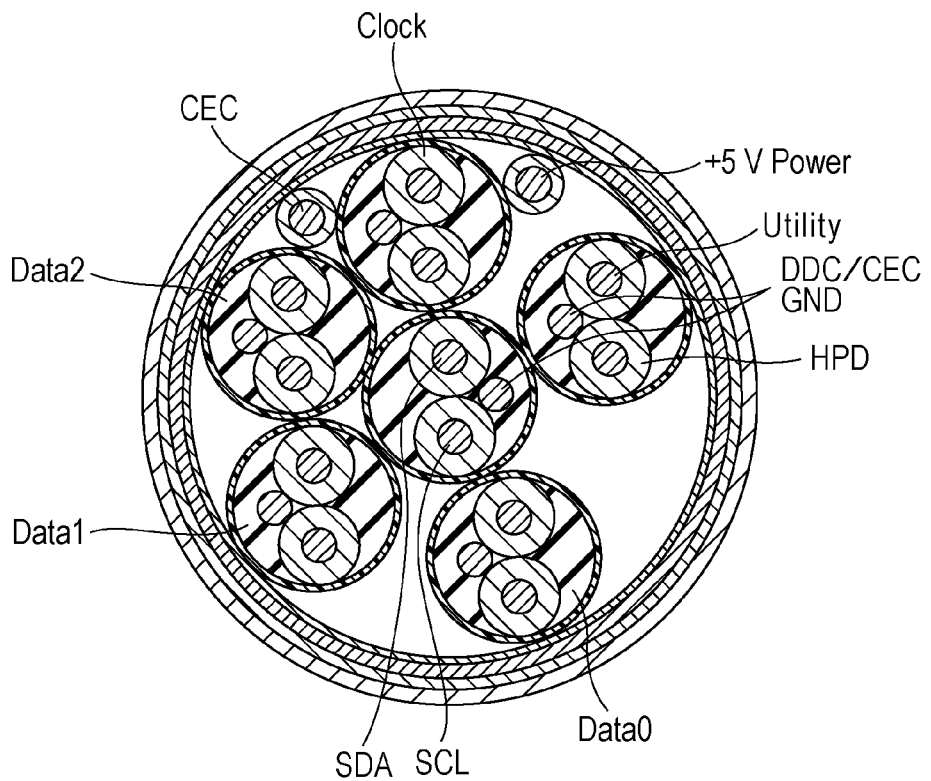
FIG. 27 is a diagram illustrating a configuration of the new HDMI cable (which is compatible with the three-channel mode and the bidirectional differential communication mode)

FIG. 27 shows a configuration of the new HDMI cable used as the cable 200. This new HDMI cable is compatible with the three-channel mode and the bidirectional differential communication mode (refer to FIG. 20). As with the general HDMI cable shown in FIG. 8, in the new HDMI cable, three data line pairs are configured as shield twisted pair units so as to attain properties of the three data line pairs. Furthermore, the two signal lines (the SDA line and the SCL line) included in the DDC line are also configured as a shield twisted pair used to perform the bidirectional differential communication.

Figure 28:
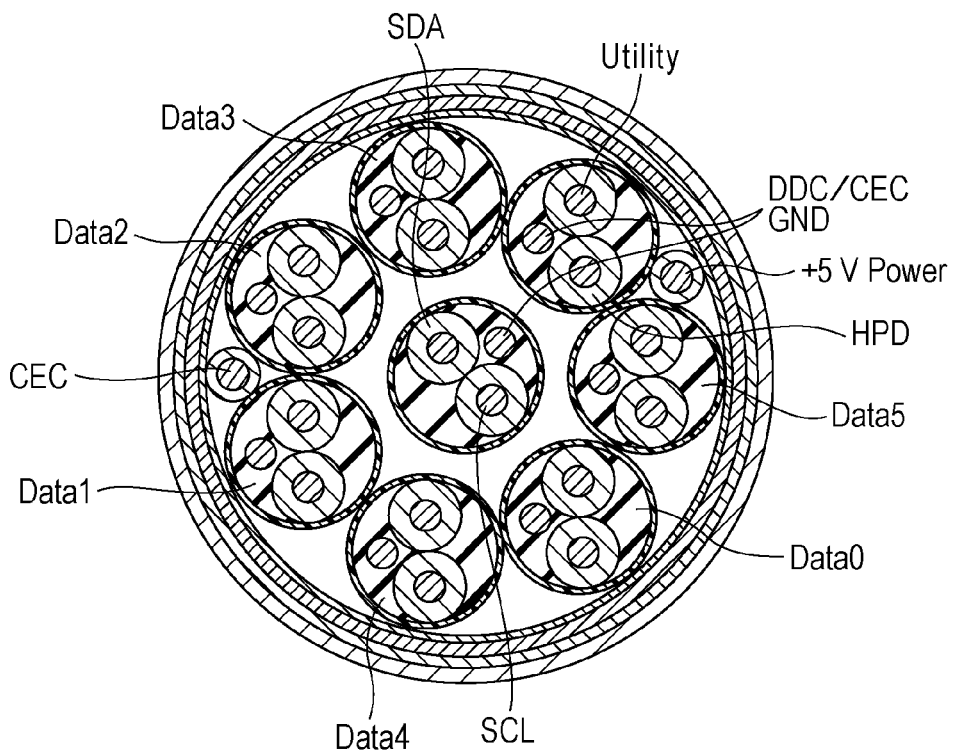
FIG. 28 is a diagram illustrating a configuration of the new HDMI cable (which is compatible with the six-channel mode and the bidirectional differential communication mode)

FIG. 28 shows a configuration of the new HDMI cable used as the cable 200. This new HDMI cable is compatible with the six-channel mode and the bidirectional differential communication mode (refer to FIG. 21). As with the new HDMI cable shown in FIG. 9, in the new HDMI cable, six data line pairs are configured as shield twisted pair units so as to attain properties of the six data line pairs. Furthermore, the two signal lines (the SDA line and the SCL line) included in the DDC line are also configured as a shield twisted pair used to perform the bidirectional differential communication.

Determination Whether Cable is Compatible with Bidirectional Differential Communication Next, a method for determining whether the cable 200 is compatible with the bidirectional differential communication, that is, a method for determining whether the two signal lines (the SDA line and the SCL line) included in the DDC line are configured as a shield twisted pair will be described. Although a detailed description of the determination is omitted here, as with "Determination as to whether Cable is Compatible with New HDMI" described above, the following first to fourth methods (1) to (4) may be realized (refer to FIGS. 14 to 19).

(1) Information representing that the cable 200 is compatible with the new communication method is stored in the cable 200 and the apparatus recognizes that the cable 200 is compatible with the new communication method by accessing the information by a certain method by issuing a CEC command when the HPD is in a low state, for example.

(2) The cable 200 itself additionally writes information representing that the cable 200 is compatible with the new communication method when the EDID is transmitted so that the source apparatus receives the information.

(3) A communication unit using another path such as an RFID is provided between the cable 200 and the apparatus and recognizes that the cable 200 is compatible with the new communication method.

(4) The source apparatus issues a measurement/detection signal to the sink apparatus and the sink apparatus notifies another communication unit of the signal received by the sink apparatus or of match or mismatch of the signal with an expectation value.

Note that, the fourth method (4) is not applicable to a portion described below in the "determination as to whether the cable is compatible with the bidirectional differential communication" in the "determination as to whether the cable is compatible with the new HDMI" described above. That is, the fourth method is not applicable to a portion in which "when the general HDMI cable is used, interference caused by applying a signal which is not associated with the pin 2 to the pin 1 or the pin 3 which is associated with the pin 2 may be utilized to make the determination". Furthermore, an error rate to be ensured is not 10-9 but approximately 10-12 taking an effect of an error correction technique subjected to transmission data into consideration.

As described above, in the AV system 100 shown in FIG. 1, the data transmission unit 112 of the source apparatus 110 has the operation mode corresponding to the new HDMI mode in addition to the operation mode corresponding to the general HDMI. Here, three differential signal channels are used to transmit a digital signal such as video data in the general HDMI whereas six differential signal channels are used in the HDMI. Therefore, when the new HDMI is used, signal transmission may be performed in a high data rate. Furthermore, since the general HDMI is used when the sink apparatus 120 and the cable 200 are not compatible with the new HDMI, backward compatibility is ensured.

Furthermore, in the AV system 100 shown in FIG. 1, each of the source apparatus 110 and the sink apparatus 120 which have a bidirectional differential communication function may selectively connect the I2C communication unit or the differential high-speed driver/receiver to the two signal lines included in the DDC line. Therefore, the bidirectional differential communication may be performed without increasing the number of signal lines included in the cable 200, and accordingly, a large amount of data may be transmitted and received.

Consequently, for example, high-quality inter-device cooperation application based on large-amount bidirectional data communication may be realized without additional connection in apparatuses connected through an HDMI network. Furthermore, for example, future application using a domestic high-speed communication mainly including the Gigabit Ethernet may be realized without additional connection in the apparatuses connected through the HDMI network.

2. Modification

Note that, in the foregoing embodiment, the plug of the new HDMI cable has a shape the same as that of the plug of the general HDMI cable. However, the shape of the plug of the new HDMI cable may be different from the shape of the plug of the general HDMI cable so that the source apparatus and the sink apparatus are not connected to the new HDMI cable when the source apparatus or the sink apparatus is not compatible with the new HDMI.

Figure 29B:
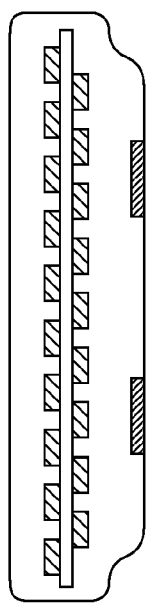
FIGS. 29A and 29B are diagrams illustrating a shape of a cable plug and a shape of a receptacle of the general HDMI, respectively.
Figure 29D:
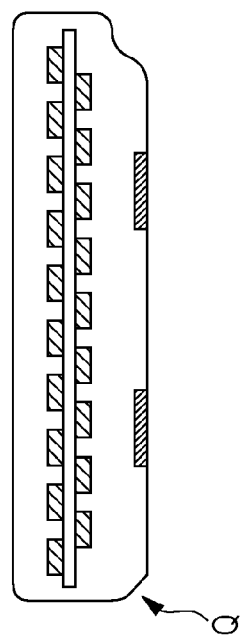
FIGS. 29C and 29D are diagrams illustrating a shape of a cable plug and a shape of a receptacle of the new HDMI.
Figure 29A:
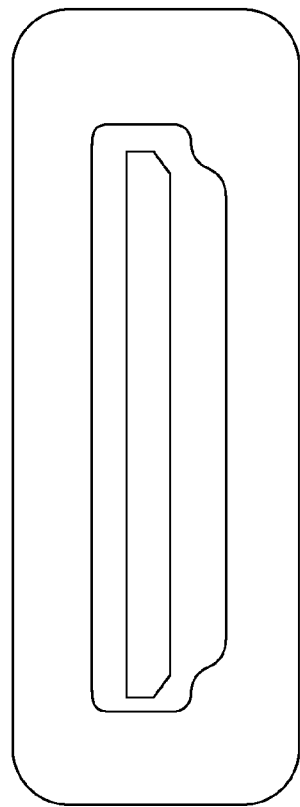
Figure 29C:
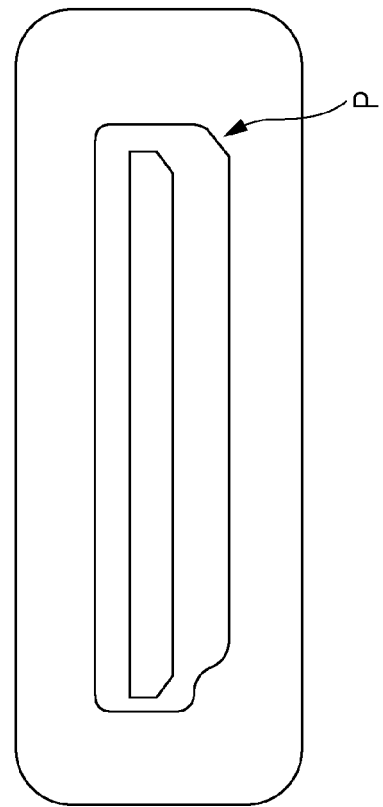
Figure 30A:
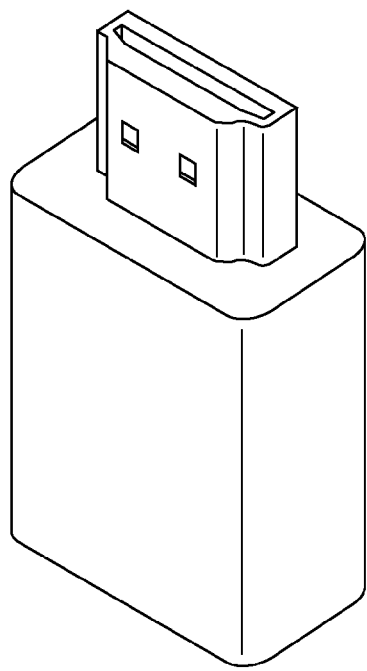
FIGS. 30A and 30B are perspective views illustrating the plug of the general HDMI cable and the plug of the new HDMI cable, respectively.
Figure 30B:
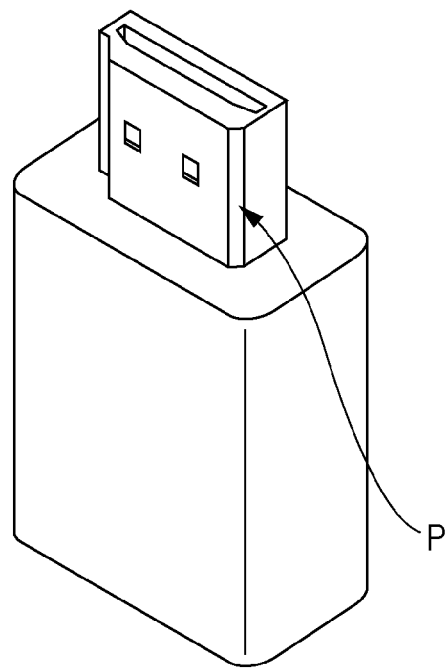

FIG. 29A shows a shape of a plug of a general HDMI cable and FIG. 29B shows a shape of a receptacle of a source apparatus or a sink apparatus which is only compatible with the general HDMI. On the other hand, FIG. 29C shows a shape of a plug of a new HDMI cable and FIG. 29D shows a shape of a receptacle of a source apparatus or a sink apparatus which is compatible with the new HDMI. Note that FIG. 30A is a perspective view of the plug of the general HDMI cable and FIG. 30B is a perspective view of the plug of the new HDMI cable.

The plug of the new HDMI cable includes a projecting portion (denoted by an arrow mark P). The receptacle of the source apparatus or the sink apparatus which is compatible with the new HDMI includes a recessed portion (denoted by an arrow mark Q) corresponding to the projecting portion of the plug. In this case, the shape of the receptacle of the source apparatus or the sink apparatus which is compatible with the new HDMI fits the shape of the plug of the new HDMI cable and enclose the shape of the plug of the general HDMI cable.

Since the shape of the plug of the new HDMI cable and the shape of the receptacle of the source apparatus or the sink apparatus which is compatible with the new HDMI are set as described above, the new HDMI cable may be connected to the receptacle of the source apparatus or the sink apparatus which is compatible with the new HDMI. However, the new HDMI cable may not be connected to the receptacle of the source apparatus or the sink apparatus which is only compatible with the general HDMI. Therefore, when one of the source apparatus and the sink apparatus is not compatible with the new HDMI, the source apparatus and the sink apparatus are not connected to each other through the new HDMI cable. Specifically, only when both of the source apparatus and the sink apparatus are compatible with the new HDMI, the source apparatus and the sink apparatus may be connected to each other using the new HDMI cable.

As described above, the shape of the receptacle of the source apparatus or the sink apparatus which is also compatible with the new HDMI fits the shape of the plug of the new HDMI cable and encloses the shape of the plug of the general HDMI cable. Therefore, the general HDMI cable may be connected to not only the receptacle of the source apparatus or the sink apparatus which is only compatible with the general HDMI but also the receptacle of the source apparatus or the sink apparatus which is compatible with the new HDMI.

Furthermore, in the foregoing embodiment, the case of the three differential signal channels used to transmit a digital signal such as video data in the general HDMI and the case of the six differential signal channels in the new HDMI have been described. However, the number of differential signal channels used to transmit a digital signal such as video data is not limited to six, and four, five, or seven may be employed. For example, when the number of differential signal channels used to transmit a digital signal such as video data is set to five and a speed of a clock frequency is increased approximately 1.2 times, a data transmission speed the same as that in the case of six channels may be obtained.

Furthermore, in the foregoing embodiment, the present technique is applied to the AV system in which the source apparatus and the sink apparatus are connected to each other through the digital interface which conforms to the HDMI standard. The present technique is similarly applicable to an AV system in which another similar digital interface is used for the connection.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus comprising:
    a first communication unit configured to perform Inter-Integrated Circuit (I2C) bidirectional communication with an external apparatus using two signal lines included in a transmission path as I2C communication lines;
    a second communication unit configured to perform bidirectional differential communication with the external apparatus using the two signal lines as bidirectional differential communication lines;
    a switching unit configured to select a first communication state in which the first communication unit is connected to the two signal lines or a second communication state in which the second communication unit is connected to the two signal lines; and
    a controller configured to control operation of the switching unit.

2. The electronic apparatus according to claim 1, wherein a data transmission unit of the electronic apparatus is compatible with High Definition Multimedia Interface (HDMI) interface.

3. The electronic apparatus according to claim 2, wherein the two signal lines comprises a serial data (SDA) line and a serial clock (SCL) line of a High Definition Multimedia Interface HDMI standard.

4. The electronic apparatus according to claim 1, wherein the switching unit includes a first transistor used to connect the first communication unit and the two signal lines to each other and a second transistor used to connect the second communication unit and the two signal lines to each other.

* * * * *